United States Patent
Berg et al.

(10) Patent No.: US 7,147,074 B1
(45) Date of Patent: Dec. 12, 2006

(54) SNOWMOBILE

(75) Inventors: Norman O. Berg, Roseau, MN (US); Keith W. Peppel, Roseau, MN (US); Richard H. Bates, Jr., Badger, MN (US); Edwin M. Monsrud, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/782,506

(22) Filed: Feb. 18, 2004

Related U.S. Application Data

(63) Continuation of application No. 10/236,607, filed on Sep. 6, 2002, now Pat. No. 6,796,395.

(60) Provisional application No. 60/318,151, filed on Sep. 7, 2001, provisional application No. 60/317,892, filed on Sep. 7, 2001.

(51) Int. Cl.
B62M 27/02 (2006.01)

(52) U.S. Cl. .................... 180/190; 180/186

(58) Field of Classification Search ............ 180/190, 180/186, 184, 9.25, 9.1, 182, 68.3, 68.1; 280/771
See application file for complete search history.

(56) References Cited

U.S. PATENT DOCUMENTS

| | | | |
|---|---|---|---|
| 3,237,716 A * | 3/1966 | Parsons .................... 181/243 |
| 3,572,813 A * | 3/1971 | Takada .................. 296/193.12 |
| 3,698,497 A | 10/1972 | Bombardier |
| 3,776,354 A | 12/1973 | Duclo et al. |
| 3,795,287 A * | 3/1974 | Rose ........................ 181/283 |
| 3,815,558 A | 6/1974 | Tenney |
| 3,815,696 A | 6/1974 | Larlve et al. |
| 3,870,115 A | 3/1975 | Hase |
| 3,963,083 A | 6/1976 | Reese |
| 3,971,452 A | 7/1976 | Morelli |
| 4,008,777 A | 2/1977 | Juto et al. |
| 4,313,511 A | 2/1982 | Soo Hoo |
| 4,633,964 A | 1/1987 | Boyer et al. |
| 4,676,332 A | 6/1987 | Saito |
| 4,688,817 A | 8/1987 | Marier |
| 4,815,420 A | 3/1989 | Bartsch |
| D314,535 S | 2/1991 | Matsue |
| 5,004,257 A | 4/1991 | MacIsaac |
| 5,054,798 A | 10/1991 | Zulawski |
| 5,074,374 A | 12/1991 | Ohtake et al. |
| 5,117,932 A * | 6/1992 | Kurosu et al. ............. 180/68.2 |
| 5,172,786 A | 12/1992 | Ishibashi et al. |
| 5,211,013 A * | 5/1993 | Bonde et al. .................. 60/323 |
| 5,474,146 A | 12/1995 | Yoshioka et al. |
| 5,555,932 A * | 9/1996 | Dudley ....................... 165/135 |
| 5,586,614 A | 12/1996 | Kouchi et al. |
| 5,660,245 A | 8/1997 | Marier et al. |
| 5,685,387 A | 11/1997 | Rioux et al. |
| 5,797,778 A | 8/1998 | Ito et al. |
| 5,844,177 A * | 12/1998 | Pirchl ......................... 181/211 |
| 6,155,371 A | 12/2000 | Izumi |

(Continued)

FOREIGN PATENT DOCUMENTS

JP  9-287531  11/1997

(Continued)

Primary Examiner—Tony Winner
(74) Attorney, Agent, or Firm—Baker & Daniels LLP

(57) ABSTRACT

A snowmobile including a chassis, shell, and an engine. The shell may be fixed to a front portion of the chassis and extend away from the chassis in a forward direction. The shell may be disposed forward of the steering axis. The shell may define a chamber that fluidly communicates with the engine via a flexible coupling interposed between the shell and the engine.

35 Claims, 27 Drawing Sheets

U.S. PATENT DOCUMENTS

| | | |
|---|---|---|
| 6,170,589 B1 | 1/2001 | Kawano et al. |
| D438,821 S | 3/2001 | Cadotte et al. |
| 6,227,323 B1 * | 5/2001 | Ashida ................ 180/190 |
| 6,234,263 B1 | 5/2001 | Boivin et al. |
| 6,357,543 B1 | 3/2002 | Karpik |
| 6,454,037 B1 | 9/2002 | Atsuumi et al. |
| 6,467,787 B1 | 10/2002 | Marsh |
| 6,510,912 B1 | 1/2003 | Atsuumi |
| 6,581,720 B1 * | 6/2003 | Chen et al. .............. 181/205 |
| 2001/0001995 A1 | 5/2001 | Izumi et al. |
| 2001/0032745 A1 | 10/2001 | Shoenfelder |
| 2001/0040063 A1 | 11/2001 | Wubbolts et al. |
| 2001/0040064 A1 | 11/2001 | Girouard et al. |
| 2001/0047900 A1 | 12/2001 | Fecteau et al. |
| 2002/0000340 A1 | 1/2002 | Laimbock |
| 2002/0027029 A1 | 3/2002 | Yatagai et al. |
| 2002/0029920 A1 | 3/2002 | Fournier et al. |
| 2004/0159482 A1 * | 8/2004 | Eide ..................... 180/182 |
| 2004/0188159 A1 * | 9/2004 | Yatagai et al. ............. 180/182 |

FOREIGN PATENT DOCUMENTS

| | | |
|---|---|---|
| JP | 2000-355221 | 12/2000 |
| JP | 2001-65344 | 3/2001 |

* cited by examiner

|  | PERCENTILE VALUES IN CENTIMETERS ||||||
|  | 5TH PERCENTILE ||| 95TH PERCENTILE |||
|  | GROUND TROOPS | AVIATORS | WOMEN | GROUND TROOPS | AVIATORS | WOMEN |
| --- | --- | --- | --- | --- | --- | --- |
| WEIGHT (kg) | 55.5 | 60.4 | 46.4 | 91.6 | 96.0 | 74.5 |
| STANDING BODY DIMENSIONS |  |  |  |  |  |  |
| 1 STATURE | 162.8 | 164.2 | 152.4 | 185.6 | 187.7 | 174.1 |
| 2 EYE HEIGHT (STANDING) | 151.1 | 152.1 | 140.9 | 173.3 | 175.2 | 162.2 |
| 3 SHOULDER (ACROMIALE) HEIGHT | 133.6 | 133.3 | 123.0 | 154.2 | 154.8 | 143.7 |
| 4 CHEST (NIPPLE) HEIGHT * | 117.9 | 120.8 | 109.3 | 136.5 | 138.5 | 127.8 |
| 5 ELBOW (RADIALE) HEIGHT | 101.0 | 104.8 | 94.9 | 117.8 | 120.0 | 110.7 |
| 6 FINGERTIP (DACTYLION) HEIGHT |  | 61.5 |  |  | 73.2 |  |
| 7 WAIST HEIGHT | 96.6 | 97.6 | 93.1 | 115.2 | 115.1 | 110.3 |
| 8 CROTCH HEIGHT | 76.3 | 74.7 | 68.1 | 91.8 | 92.0 | 83.9 |
| 9 GLUTEAL FURROW HEIGHT | 73.3 | 74.6 | 66.4 | 87.7 | 88.1 | 81.0 |
| 10 KNEECAP HEIGHT | 47.5 | 46.8 | 43.8 | 58.6 | 57.8 | 52.5 |
| 11 CALF HEIGHT | 31.1 | 30.9 | 29.0 | 40.6 | 39.3 | 36.6 |
| 12 FUNCTIONAL REACH | 72.6 | 73.1 | 64.0 | 90.9 | 87.0 | 80.4 |
| 13 FUNCTIONAL REACH, EXTENDED | 84.2 | 82.3 | 73.5 | 101.2 | 97.3 | 92.7 |
|  | PERCENTILE VALUES IN INCHES ||||||
| WEIGHT (lb) | 122.4 | 133.1 | 102.3 | 201.9 | 211.6 | 164.3 |
| STANDING BODY DIMENSIONS |  |  |  |  |  |  |
| 1 STATURE | 64.1 | 64.6 | 60.0 | 73.1 | 73.9 | 68.5 |
| 2 EYE HEIGHT (STANDING) | 59.5 | 59.9 | 55.5 | 68.2 | 69.0 | 63.9 |
| 3 SHOULDER (ACROMIALE) HEIGHT | 52.6 | 52.5 | 48.4 | 60.7 | 60.9 | 56.6 |
| 4 CHEST (NIPPLE) HEIGHT * | 46.4 | 47.5 | 43.0 | 53.7 | 54.5 | 50.3 |
| 5 ELBOW (RADIALE) HEIGHT | 39.8 | 41.3 | 37.4 | 46.4 | 47.2 | 43.6 |
| 6 FINGERTIP (DACTYLION) HEIGHT |  | 24.2 |  |  | 28.8 |  |
| 7 WAIST HEIGHT | 38.0 | 38.4 | 36.6 | 45.3 | 45.3 | 43.4 |
| 8 CROTCH HEIGHT | 30.0 | 29.4 | 26.8 | 36.1 | 36.2 | 33.0 |
| 9 GLUTEAL FURROW HEIGHT | 28.8 | 29.4 | 26.2 | 34.5 | 34.7 | 31.9 |
| 10 KNEECAP HEIGHT | 18.7 | 18.4 | 17.2 | 23.1 | 22.8 | 20.7 |
| 11 CALF HEIGHT | 12.2 | 12.2 | 11.4 | 16.0 | 15.5 | 14.4 |
| 12 FUNCTIONAL REACH | 28.6 | 28.8 | 25.2 | 35.8 | 34.3 | 31.7 |
| 13 FUNCTIONAL REACH, EXTENDED | 33.2 | 32.4 | 28.9 | 39.8 | 38.3 | 36.5 |

* BUSTPOINT HEIGHT FOR WOMEN

FIG. 26

* SAME AS 12, HOWEVER, RIGHT SHOULDER IS EXTENDED AS FAR FORWARD AS POSSIBLE WHILE KEEPING THE BACK OF THE LEFT SHOULDER FIRMLY AGAINST THE BACK WALL

SNOWMOBILE

RELATED APPLICATIONS

This is a Continuation of application Ser. No. 10/236,607 filed Sep. 6, 2002 now U.S. Pat. No. 6,796,395.

This application is related to and claims priority to U.S. Provisional Application No. 60/318,151, filed Sep. 7, 2001, and entitled Snowmobile Drivetrain.

This application is also related to and claims priority to U.S. Provisional Application No. 60/317,892, filed Sep. 7, 2001, and entitled Snowmobile Providing an Enhanced Riding Experience.

The entire disclosures of the above mentioned applications are hereby incorporated by reference in their entirety.

FIELD OF THE INVENTION

The present invention relates generally to snowmobiles. More particularly, the present invention relates to the human-to-machine interface of a snowmobile.

BACKGROUND OF THE INVENTION

Since their development in the middle of the $20^{th}$ century, snowmobiles have gained widespread popularity. Snowmobiles are commonly used for trail riding and utility applications. Perhaps the most common snowmobile application is recreational trail riding. Trail riding on a snowmobile allows a snowmobile enthusiast to travel through areas which are not accessible by other types of vehicles. For example, snowmobiles can travel very rapidly across frozen lakes during the winter in northern climates. Modern snowmobiles, can cover ground very rapidly and can cover great distances. Frequently, snowmobile enthusiasts ride their snowmobile for many hours straight and cover many miles.

A rider operates a snowmobile by providing inputs such as acceleration inputs provided using a throttle, deceleration inputs provided using a brake, and steering inputs provided using a set of handle bars. The rider may also influence the performance of the machine by shifting his or her weight, for example, by leaning into a turn.

Frequently, people become interested in snowmobiling because of the unique riding experience that snowmobiles provide. Part of the thrill of riding a snowmobile is encountering challenging terrain, and traversing that terrain through a combination of the skill of the rider and the way that the snowmobile reacts to the inputs provided by the rider. Aspects of a snowmobile such as the overall weight of the snowmobile, the weight distribution of the snowmobile, and the location of the snowmobile center of gravity all effect the riding experience enjoyed by a snowmobiling enthusiast.

The ability of a rider to traverse challenging terrain smoothly and quickly frequently depends upon the way that the snowmobile responds to the rider. As mentioned previously, the rider can control the snowmobile by providing inputs using the handlebar, brake and throttle. The rider can also control the snowmobile by selectively shifting his or her weight.

The way that a particular snowmobile responds to inputs provided by a rider may depend upon the snowmobile's total inertia, the snowmobile's moment of inertia, and the location of the snowmobile's center of gravity. The total inertia of a snowmobile has an effect on that snowmobile's performance because this total inertia determines the extent to which the snowmobile will resist changes in location and linear velocity. For example, the inertia of an overly heavy snowmobile may limit how rapidly that snowmobile can accelerate and decelerate. The moment of inertia of a snowmobile also has an effect on that snowmobile's performance, since it determines the extent to which the snowmobile will resists changes in angular position and rotational velocity. The moment of inertia of a snowmobile is determine, at least in part by the total mass of the snowmobile the way in which that mass is distributed.

SUMMARY OF THE INVENTION

The present invention relates generally to snowmobiles providing an enhanced riding experience. More particularly, the present invention relates to the human-to-machine interface of a snowmobile. A snowmobile in accordance with the present invention may include a frame defining a tunnel and a drive track rotatably supported within the tunnel. The snowmobile may also include an engine connected to the frame and operatively coupled to the drive track by a drivetrain.

A seat may be fixed to the frame for receiving a rider of the snowmobile. A pair of handle bars may be rotatably coupled to the frame and adapted to receive the hands of the rider. A pair of floor boards may be fixed to the frame and adapted to receive the feet of the rider. In some embodiments, the floor boards include toe stops.

In one aspect of the invention, the engine includes a cylinder bore having a cylinder bore axis that is directed rearwardly and upwardly so that a center of mass of the engine is disposed rearward of a center of rotation of a crank shaft of the engine. Placing the engine in this position may provide a snowmobile having a lower polar moment of inertia compared to a snowmobile having an engine with a center of mass positioned directly above, or in front of the rotational center of the crankshaft.

The engine of the snowmobile has a first side extending in a first direction from the cylinder bore axis and a second side extending in a second direction from the cylinder bore axis. In one advantageous aspect of the present invention, air may enter the cylinder bore from the first side of the engine, and exhaust gases may exit the engine from the same side. In some applications, this arrangement may facilitating placing the fuel tank in close proximity to the cylinder of the engine.

In still another aspect of the present invention, the fuel tank has a front wall that is generally sloped rearwardly and upwardly. In some implementations of the present invention, the sloped wall of the snowmobile is generally parallel to the cylinder bore axis of the engine. In some implementations, the fuel tank and the engine may be positioned in such close proximity to one another, that a lateral reference plane passing through the snowmobile intersects both the fuel tank and the cylinder of the engine.

In an additional aspect of the invention, a starter of the snowmobile is disposed between the engine and the centroid of the snowmobile. Placing the starter in this position provides a snowmobile having a lower polar moment of inertia compared to a snowmobile having the starter disposed on a front side of the engine.

A snowmobile in accordance with the present invention may comprise a chassis, a shell fixed to a front portion the chassis and extending away from the chassis in a forward direction, and an engine coupled to the chassis for propelling the snowmobile. In some implementations, the shell defines a chamber fluidly communicating with the engine via a flexible coupling interposed between the shell and the engine.

In some implementations, the snowmobile also includes at least one ski coupled to the chassis by a suspension so that the ski is pivotable about a steering axis. In these implementations, the shell may be advantageously disposed forward of the steering axis.

In some implementations, the snowmobile includes a hood that is rotatably supported by the shell. In these implementations, a plenum defined by the hood advantageously fluidly communicates with the chamber defined by the shell at least when the hood is in a closed position. In some implementations, the chamber defined by the shell may be accessed via an opening in the shell when the hood is in the open position.

DESCRIPTION OF THE DRAWINGS

FIG. 26 is a table of standing body dimensions that appears in MIL-STD-1472C.

DETAILED DESCRIPTION

The following detailed description should be read with reference to the drawings, in which like elements in different drawings are numbered identically. The drawings, which are not necessarily to scale, depictpre-selected embodiments and are not intended to limit the scope of the invention. Examples of constructions, materials, dimensions, and manufacturing processes are provided forpre-selected elements. All other elements employ that which is known to those of skill in the field of the invention. Those skilled in the art will recognize that many of the examples provided have suitable alternatives that can be utilized.

Figure 1:
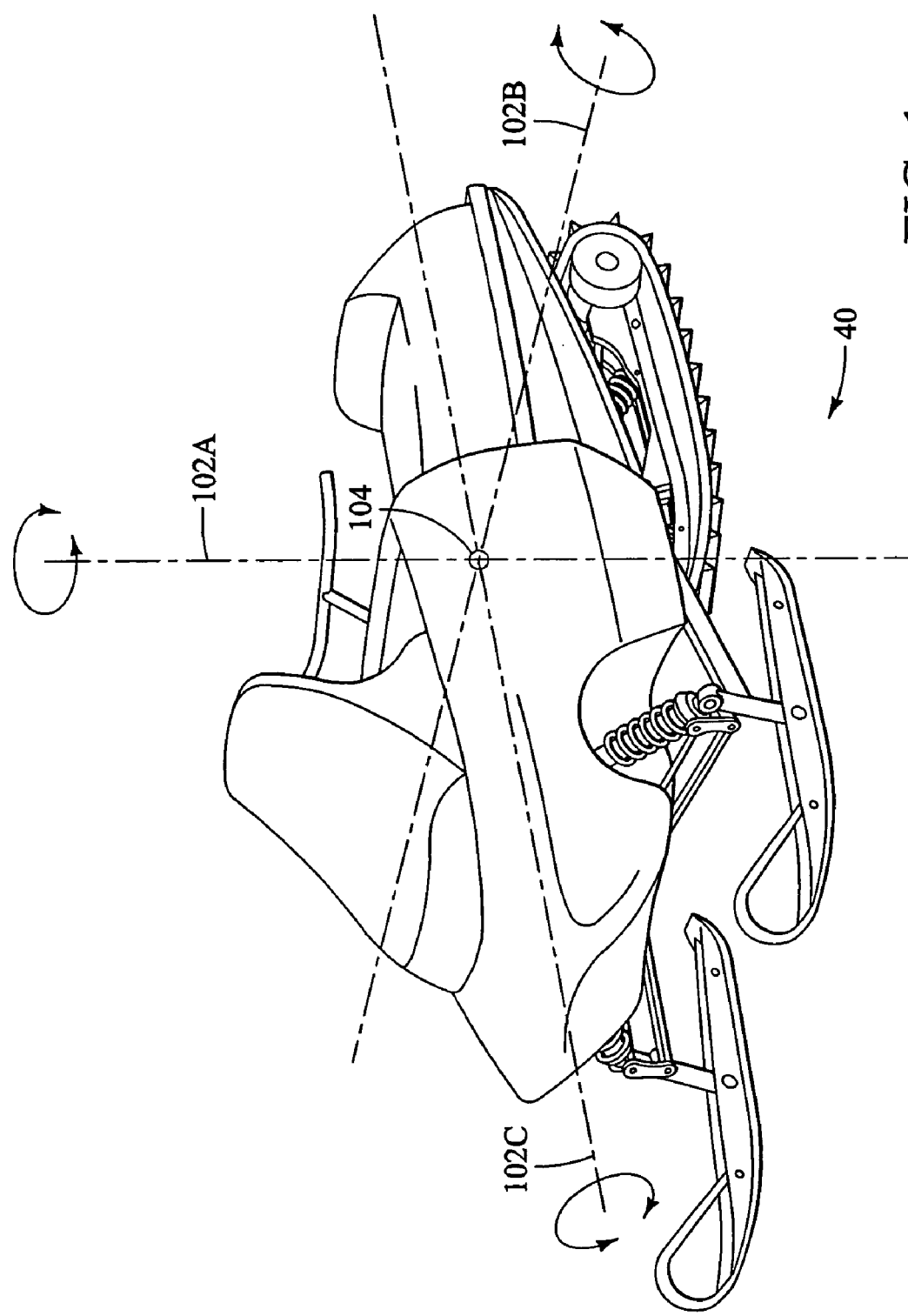
FIG. 1 is a perspective view of a snowmobile in accordance with an exemplary embodiment of the present invention.

FIG. 1 is a perspective view of a snowmobile 40 in accordance with an exemplary embodiment of the present invention. In FIG. 1, a yaw axis 102A, a pitch axis 102B, and a roll axis 102C are all shown intersecting a center of gravity 104 of snowmobile 40. Snowmobile 40 has a polar moment of inertia (PMI) about each of these axes. In a preferred embodiment of the present invention, a rider of snowmobile 40 may create or change a moment about pitch axis 102B by altering the distribution of his or her weight. For example, a moment created about pitch axis 102B by the asymmetrical application of the riders weight may be used to cause the snowmobile to assume climbing attitude or a diving attitude. When this is the case, the moment created by the rider must overcome the polar moment of inertia (PMI) of snowmobile 40 about pitch axis 102B. The level of resistance of snowmobile 40 to reacting to such a moment will be generally proportional to the polar moment of inertia of snowmobile 40.

A snowmobile in accordance with the present invention may be particularly well suited for extreme riding conditions. Examples of extreme riding conditions may include, for example, snocross racing, riding in alpine conditions, riding in deep snow, hill climbing, and water skipping. In some extreme riding conditions, it may be desirable for the rider to control the attitude of snowmobile 40 by changing driving postures.

Figure 2:
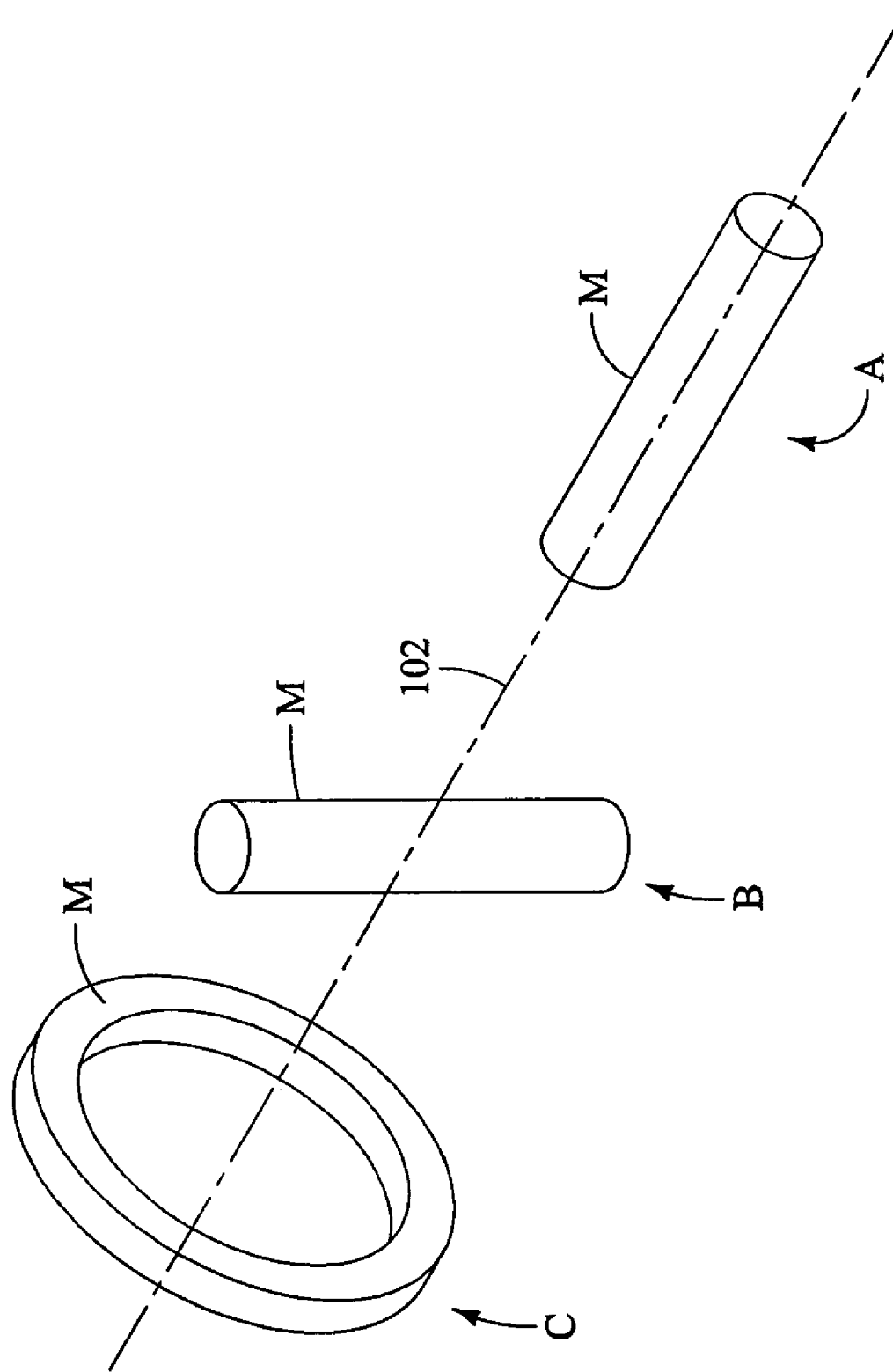
FIG. 2 is a perspective view of three exemplary bodies disposed along an axis.

FIG. 2 is a perspective view of three exemplary bodies disposed along an axis 102. Moment of inertia may be illustrated with reference to FIG. 2. In FIG. 2, each of the bodies A, B, C has a mass of M. In FIG. 2 it may be appreciated that although the three bodies A, B, C have the same mass, the mass is distributed differently about axis 102. Because the distribution of the mass is different, these three bodies have different moments of inertia about axis 102. More particularly, the moment of inertia of body A is less than the moment of inertia of body B, and the moment of inertia of body C is greater than that of body B.

A snowmobile typically includes a number of components. Some of these components have a relatively high density while others have a relatively low density. In some embodiments of the present invention, a snowmobile is provided in which relatively lightweight components are placed at the extreme ends of the snowmobile, thus enabling components having a relatively high density to located in close proximity to the geometric center of the snowmobile and/or the centroid of the snowmobile. For example, in some exemplary embodiments, a lightweight shell is disposed at the extreme front end of a snowmobile in accordance with the present invention.

Figure 3:
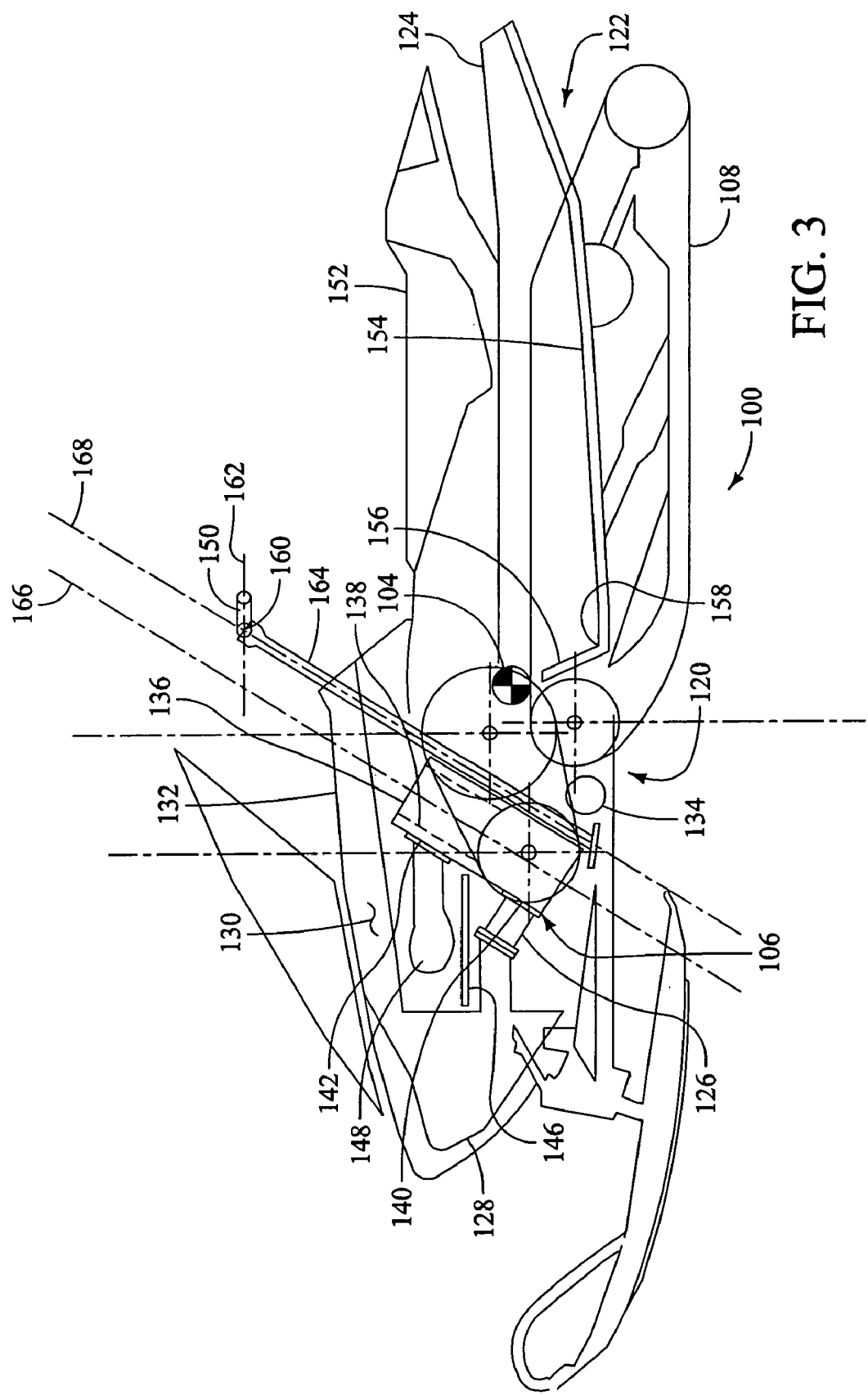
FIG. 3 is a diagrammatic plan view of a snowmobile in accordance with an exemplary embodiment of the present invention.

FIG. 3 is a diagrammatic plan view of a snowmobile 100 in accordance with an exemplary embodiment of the present invention. In FIG. 3 it may be appreciated that snowmobile 100 includes an engine 106 that is operatively coupled to a drive track 108 by a drivetrain 120. In the embodiment of FIG. 3, drive track 108 of snowmobile 100 is partially disposed within a tunnel 122 defined by a frame 124 of snowmobile 100. Drive track 108 may be used to propel snowmobile 100.

In the embodiment of FIG. 3, a throttle body 126 is fluidly coupled to engine 106. Air entering engine 106 may flow through throttle body 126. Throttle body 126 is coupled to an air box 128. Air box 128 may include filter media for filtering incoming air. Air box 128 is fluidly coupled to an air plenum 130 defined by a hood 132 of snowmobile 100. Air plenum 130 is preferably configured such that air is drawn from an area proximate the rider of snowmobile 100 and directed to air box 128.

In the embodiment of FIG. 3, a starter 134 is disposed behind and near the bottom of engine 106. Engine 106 of snowmobile 100 includes a cylinder block 136 defining a cylinder bore 138 having a cylinder bore axis 166. Cylinder block 136 also defines an air inlet port 140 and an exhaust port 142.

Air may enter cylinder bore 138 via air plenum 130, air box 128, throttle body 126 and inlet port 144. Exhaust gases may exit cylinder bore 138 via exhaust port 142 and an exhaust pipe 148 which fluidly communicates with exhaust port 142. In the embodiment of FIG. 3, air inlet port 140 and exhaust port 142 are both disposed on a front side of cylinder bore axis 166. Also in the embodiment of FIG. 3, a heat shield 146 is disposed between air inlet port 140 and exhaust port 142. In FIG. 3 it may be appreciated that a heat shield 146 is dimensioned so that it extends between throttle body 126 and exhaust pipe 148.

The human-to-machine interface of snowmobile 100 includes a handlebar 150, a seat 152, a pair of running boards 154, and a pair of toe stops 156. The operator of snowmobile 100 may control the snowmobile by applying forces to handlebar 150, seat 152, running boards 154, and toe stops 156. The operator of snowmobile 100 may also control the snowmobile by assuming various postures in which the operators weight is distributed over handlebar 150, running boards 154, toe stops 156, and seat 152 in varying degrees. In the embodiment of FIG. 3, toe stops 156 intersect running boards 154 at an intersection 158.

In the embodiment of FIG. 3, handlebar 150 rotates about a steering axis 168. Snowmobile 100 has a control point 160 that is defined by steering axis 168 and a grip plane 162. In the embodiment of FIG. 3, grip plane 162 is defined by a first grip axis and a second grip axis. In some embodiments of the present invention, handlebar 150 may be moveable between a first position and a second position with steering axis 168 and grip plane 162 defining control point 160 when handlebar 150 is in the first position, and with steering axis 168 and grip plane 162 defining second control point when handlebar 150 is in the second position.

Handlebar 150 is coupled to a steering column 164 that rotates about steering axis 168. In the embodiment of FIG. 3, cylinder bore axis 166 and steering axis 168 are generally parallel. A center of gravity 104 of snowmobile 100 is also illustrated in FIG. 3. In the embodiment of FIG. 3, engine 106 is inclined rearwardly so that the weight of engine 106 is disposed relatively close to center of gravity 104 of snowmobile 100.

Figure 4:
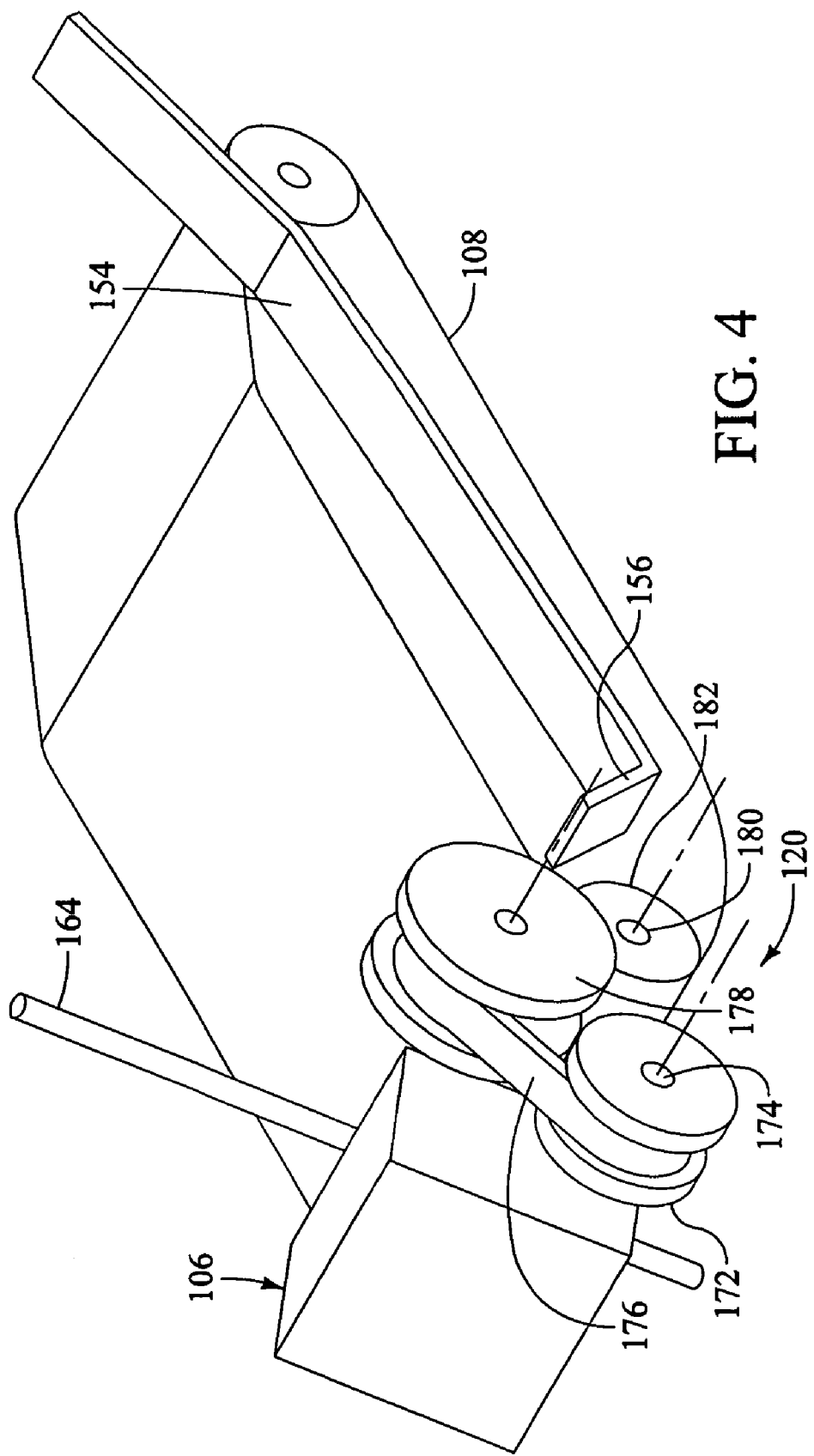
FIG. 4 is a perspective view of an assembly in accordance with an exemplary embodiment of the present invention.

FIG. 4 is a perspective view of an assembly in accordance with an exemplary embodiment of the present invention. The assembly of FIG. 4 includes a drivetrain 120 for a snowmobile. In the embodiment of FIG. 4, drivetrain 120 includes a drive clutch 172 that is coupled to a crank shaft 174 of an engine 106. A drive belt 176 is disposed about drive clutch 172 and couples drive clutch 172 to a driven clutch 178. Driven clutch 178 rotates about a driven clutch axis. Driven clutch 178 is operably coupled to a drive shaft 180 by a reducer. A drive sprocket 182 is coupled to drive shaft 180. Drive shaft 180 and drive sprocket 182 rotate about a drive shaft axis. Drive sprocket 182 preferably mates with a drive track 108. Rotation of drive sprocket 182 causes movement of drive track 108, so that drive track 108 may propel a snowmobile.

The assembly of FIG. 4 also includes a steering column 164, a running board 154, and a toe stop 156. The assembly of FIG. 4 preferably also includes a second running board 154 and a second toe stop (not shown in FIG. 4). The operator of a snowmobile including assembly may control the snowmobile by applying forces to steering column 164, running boards 154, and toe stops 156. The operator of the snowmobile may also control the snowmobile by assuming various postures in which the distribution of the operator's weight is distributed over steering column 164, a snowmobile seat, running boards 154, and toe stops 156.

Figure 5:
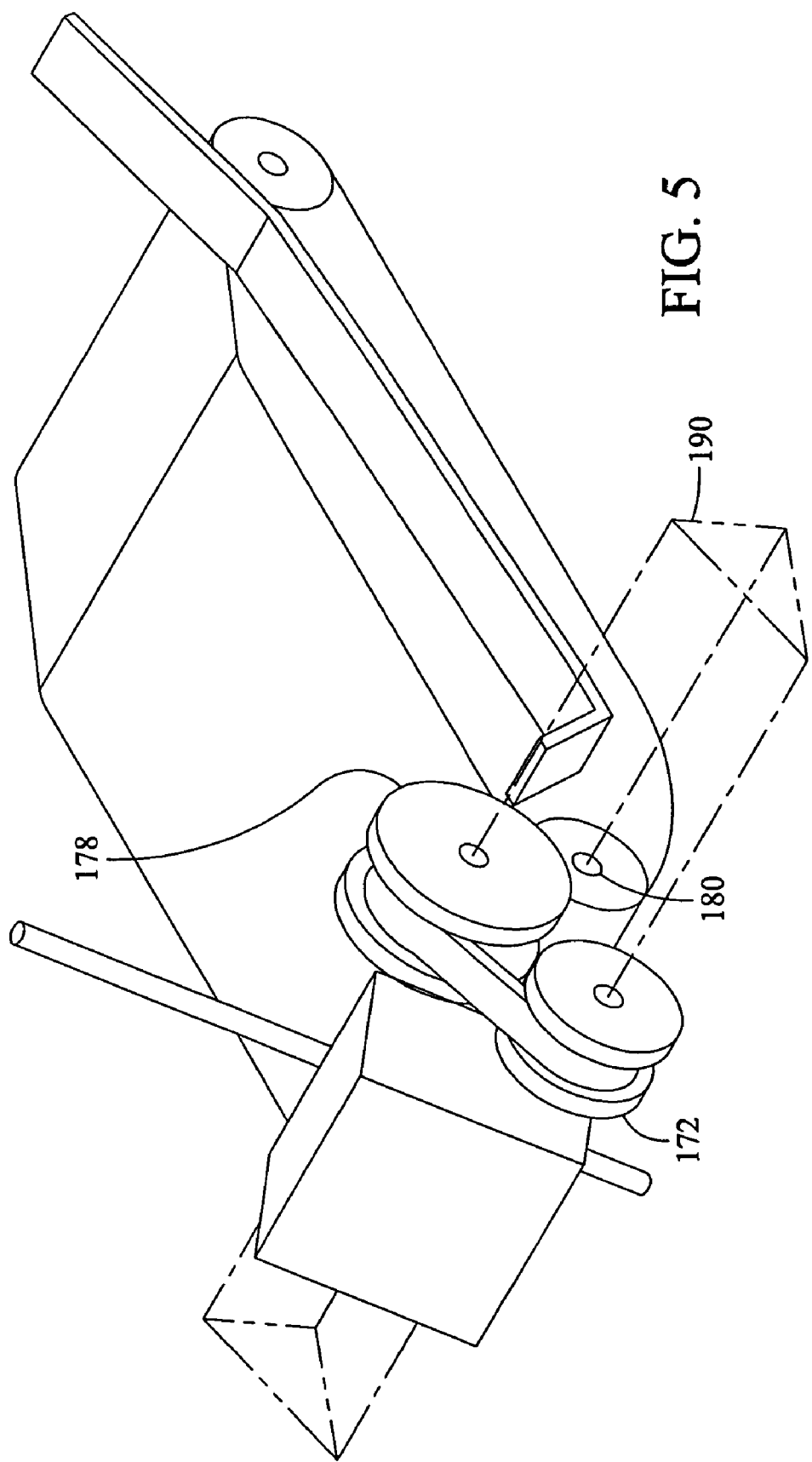
FIG. 5 is an additional perspective view of the assembly of FIG. 4.

FIG. 5 is an additional perspective view of the assembly shown in the previous figure. In FIG. 5 it may be appreciated that the rotational axis of the drive clutch 172, the rotational axis of driven clutch 178, and the rotationally axis of a drive shaft 180 define a trihedron 190. In a preferred embodiment of assembly, each side of trihedron 190 has a length that is selected to provide a relatively small polar moment of inertia (PMI).

Figure 6:
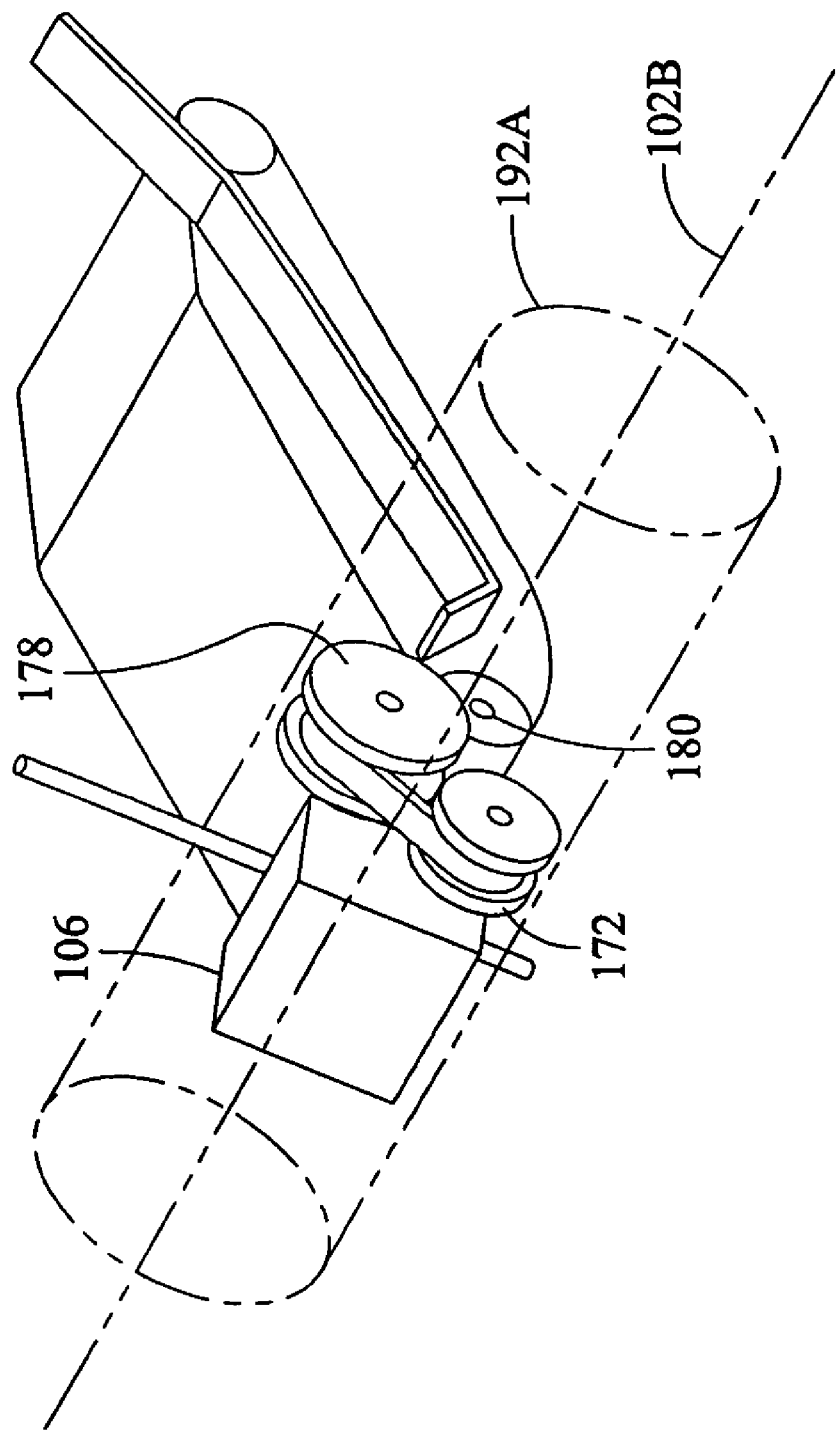
FIG. 6 is an additional perspective view of the assembly of FIG. 4.

FIG. 6 is an additional perspective view of the assembly of FIG. 4. In FIG. 6 it may be appreciated that engine 106, drive clutch 172, driven clutch 178, and drive shaft 180 are all disposed within an imaginary cylinder 192A centered on a pitch axis 102B of a snowmobile including the assembly. In a preferred embodiment, imaginary cylinder 192A has a radius that is selected to provide a relatively small polar moment of inertia (PMI) about pitch axis 102B. In some embodiments, the assembly may further include a starter that is disposed behind and near the bottom of engine 106. When this is the case, the starter is preferably disposed within imaginary cylinder 192A.

Figure 7:
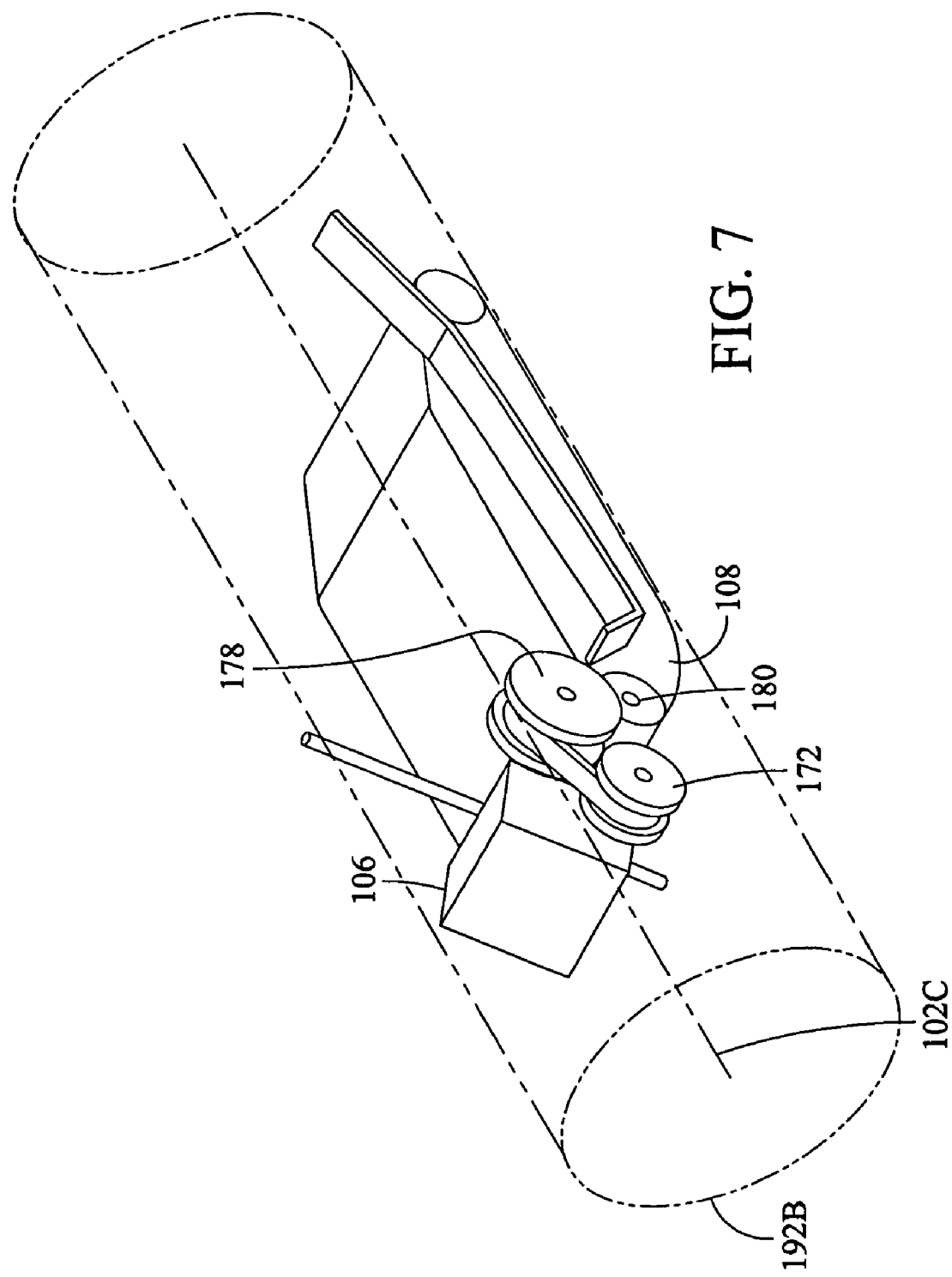
FIG. 7 is yet another perspective view of the assembly of FIG. 4.

FIG. 7 is yet another perspective view of the assembly of FIG. 4. In FIG. 7 it may be appreciated that engine 106, drive clutch 172, driven clutch 178, drive shaft 180, and drive track 108 are all disposed within an imaginary cylinder 192B centered on a roll axis 102C of a snowmobile including the assembly. In some embodiments of the present invention, a fuel tank of the snowmobile may also be disposed within imaginary cylinder 192B. In a preferred embodiment, imaginary cylinder 192B has a radius that is selected to provide a desired polar moment of inertia (PMI) about roll axis 102C.

Figure 8:
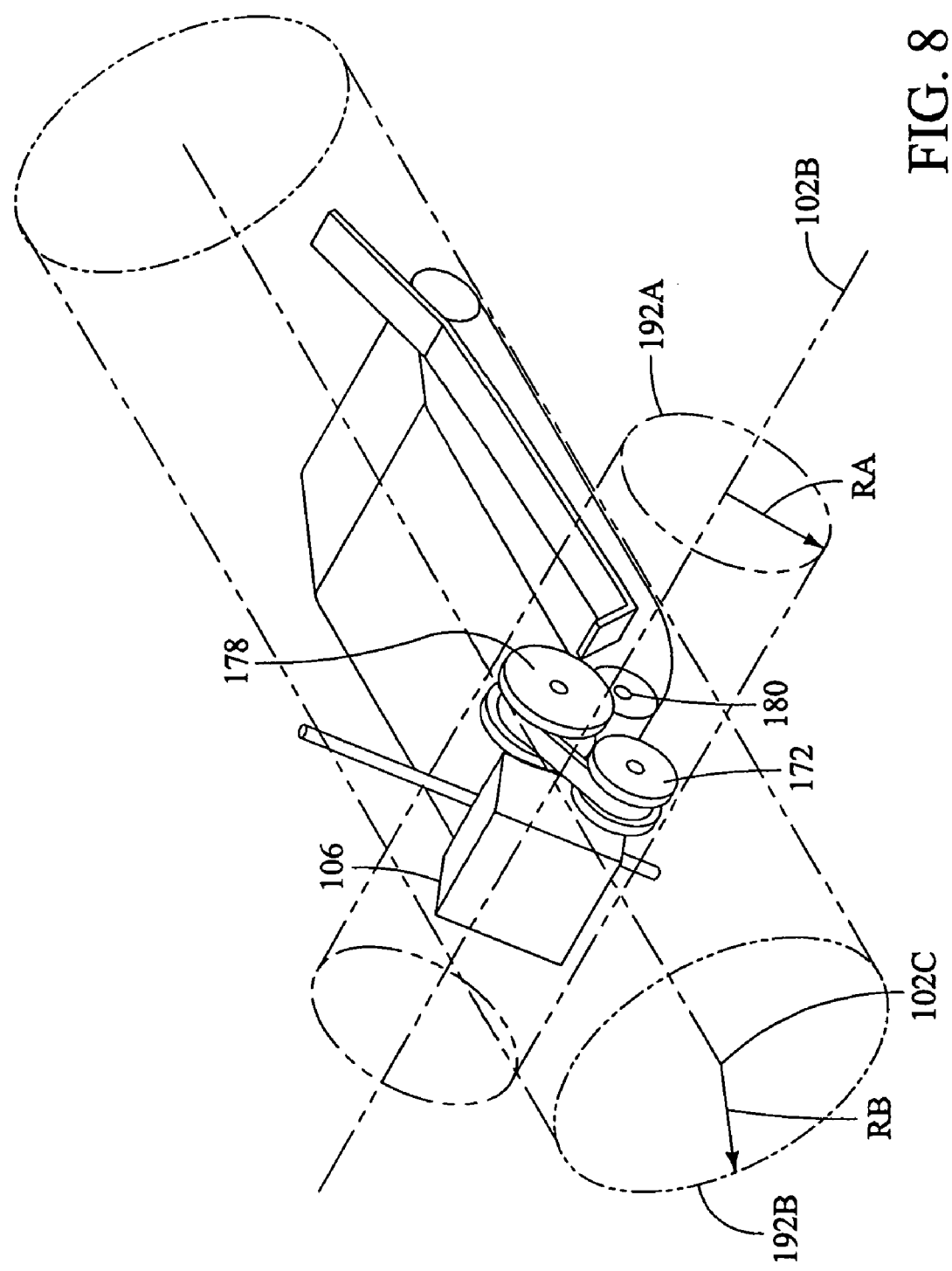
FIG. 8 is still another perspective view of the assembly of FIG. 4.

FIG. 8 is still another perspective view of the assembly of FIG. 4. In FIG. 8, it may be appreciated that engine 106, drive clutch 172, driven clutch 178, and drive shaft 180 are all disposed within first imaginary cylinder 192A and second imaginary cylinder 192B. In FIG. 8 it may be appreciated that first imaginary cylinder 192A has a first radius RA that is smaller than a second radius RB of second imaginary cylinder 192B. In some applications, a generally low and wide arrangement of drive elements provides stability about a roll axis 102C and at the same time allows a snowmobile rider to easily make adjustments to the attitude of a snowmobile about a pitch axis 102B. In one embodiment of the present invention, the radius of first imaginary cylinder 192A and the radius of second imaginary cylinder 192B are selected so that the polar moment of inertia of a snowmobile including assembly about pitch axis 102B is substantially equal to the polar moment of inertia of a snowmobile including assembly about roll axis 102C.

Figure 9:
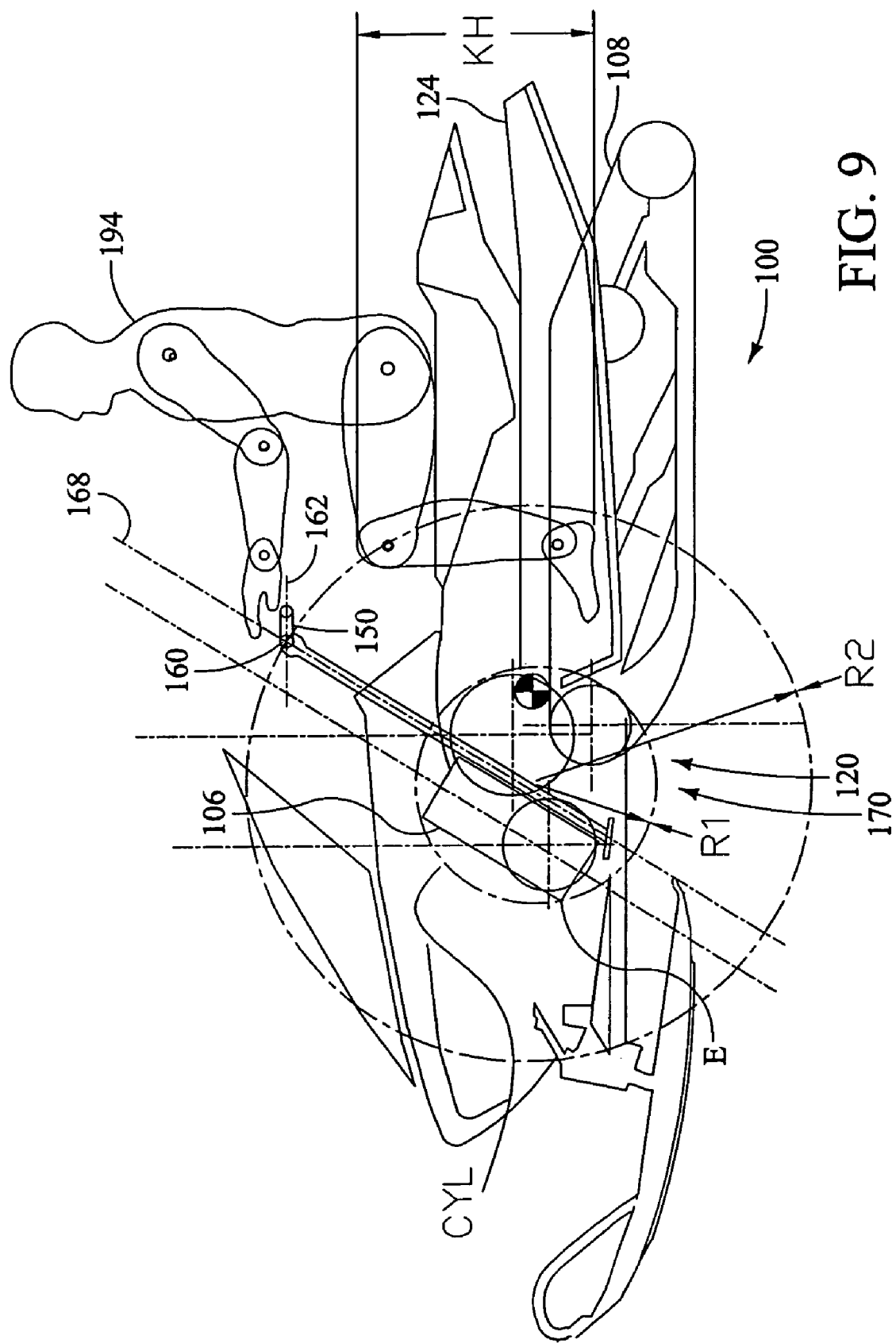
FIG. 9 is a plan view of a snowmobile and a rider.

FIG. 9 is a plan view of a snowmobile 100 and a rider 194. In FIG. 9, rider 194 is assuming a first riding posture. In a preferred embodiment of the present invention, a first moment is created about a pitch axis of snowmobile 100 when rider 194 assumes the first posture.

A snowmobile in accordance with the present invention may comprise a frame defining a tunnel, a track rotatably supported within the tunnel, and a seat fixed to the frame for receiving a rider. The snowmobile may also include a pair of handle bars rotatably coupled to the frame and adapted to receive the hands of a rider, and a pair of floor boards fixed to the frame and adapted to receive the feet of the rider. An engine of the snowmobile may be fixed to the frame and operatively coupled to the track by a drivetrain. The snowmobile may have a pitch axis extending laterally through a center of gravity thereof. In some embodiments of the present invention, the snowmobile may be configured such that a first moment about the pitch axis is created when the rider assumes a first posture and a second moment about the pitch axis is created when the rider assumes a second posture. In some embodiments of the present invention, the first moment and the second moment may have different directions.

In the embodiment of FIG. 9, snowmobile 100 includes a frame 124 and a drive 170. Drive 170 includes an engine 106 fixed to frame 124 and a drivetrain 120 operatively coupling engine 106 to a drive track 108. In FIG. 9, it may be appreciated that drive 170 includes an outer extent E that is disposed at a first radius R1 from a drive center axis extending laterally through snowmobile 100. In FIG. 9, it may also be appreciated that drive 170 is disposed within an imaginary cylinder CYL extending laterally through snowmobile 100.

Figure 10:
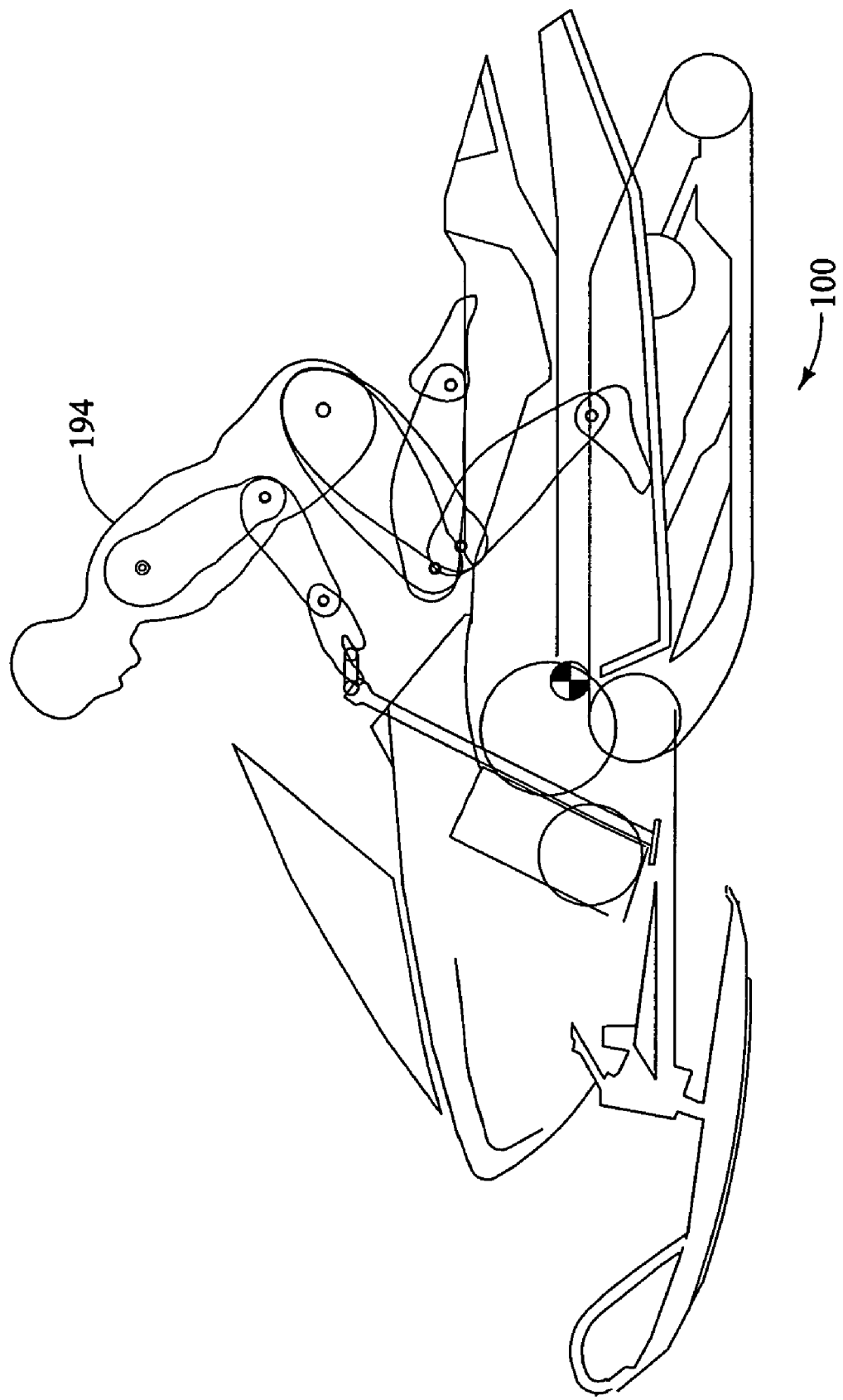
FIG. 10 is a plan view of a snowmobile and a rider.

With continuing reference to FIG. 9, it may be appreciated that a control point 160 of snowmobile 100 is disposed at a second radius R2 from the axis of imaginary cylinder CYL. In the embodiment of FIG. 9, control point 160 is defined by a steering axis 168 and a grip plane 162. In the embodiment of FIG. 9, a handlebar 150 rotates about steering axis 168. Grip plane 162 may be defined, for example, a first grip axis and a second grip axis. In some embodiments of the present invention, handlebar 150 may be moveable between a first position and a second position with steering axis 168 and grip plane 162 defining control point 160 when handlebar 150 is in the first position, and with steering axis 168 and grip plane 162 defining second control point when handlebar 150 is in the second position. A kneecap height KH of rider 194 is illustrated in FIG. 9. In certain embodiments of the present invention, first radius R1 is less than half of the kneecap height of a pre-selected snowmobile rider. In some advantageous embodiments of the present invention, second radius R2 is greater than the kneecap height of a pre-selected snowmobile rider FIG. 10 is a plan view of a snowmobile 100 and a rider 194. In FIG. 10, rider 194 is assuming a second riding posture. In a preferred embodiment of the present invention, a second moment is created about a pitch axis of snowmobile 100 when rider 194 assumes the second posture.

Figure 11:
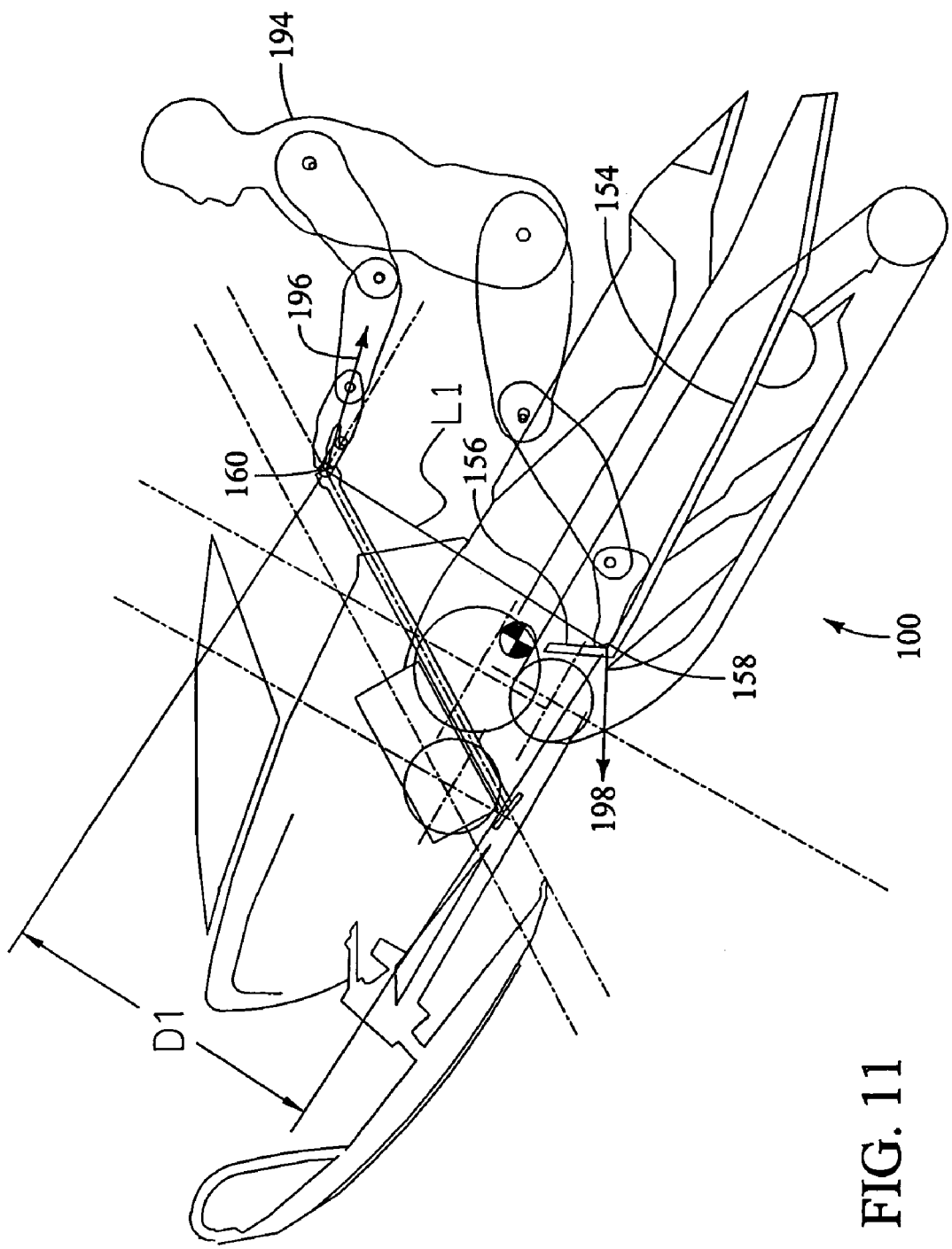
FIG. 11 is a plan view of a snowmobile and a rider.

FIG. 11 is a plan view of a snowmobile 100 and a rider 194. In the embodiment of FIG. 11, rider 194 is pulling backwardly on handlebar 150 of snowmobile 100 with a first force 196A. Also in the embodiment of FIG. 11, rider 194 is applying a generally forwardly directed second force 198B to toe stops 156 of snowmobile 100. The forces applied to snowmobile 100 by rider 194 may create a third moment about the pitch axis of snowmobile 100. In the embodiment of FIG. 11, a toe stop 156 intersects a running board 154 of snowmobile 100 at an intersection 158. In FIG. 11 it may be appreciated that intersection 158 and a control point 160 of snowmobile 100 are separated from one another by a distance D. In FIG. 11, distance D1 is measured along a plane P1 that intersects control point 160 and intersection 158. In some embodiments of the present invention, distance D1 is greater than a crotch height of a pre-selected rider.

Figure 12:
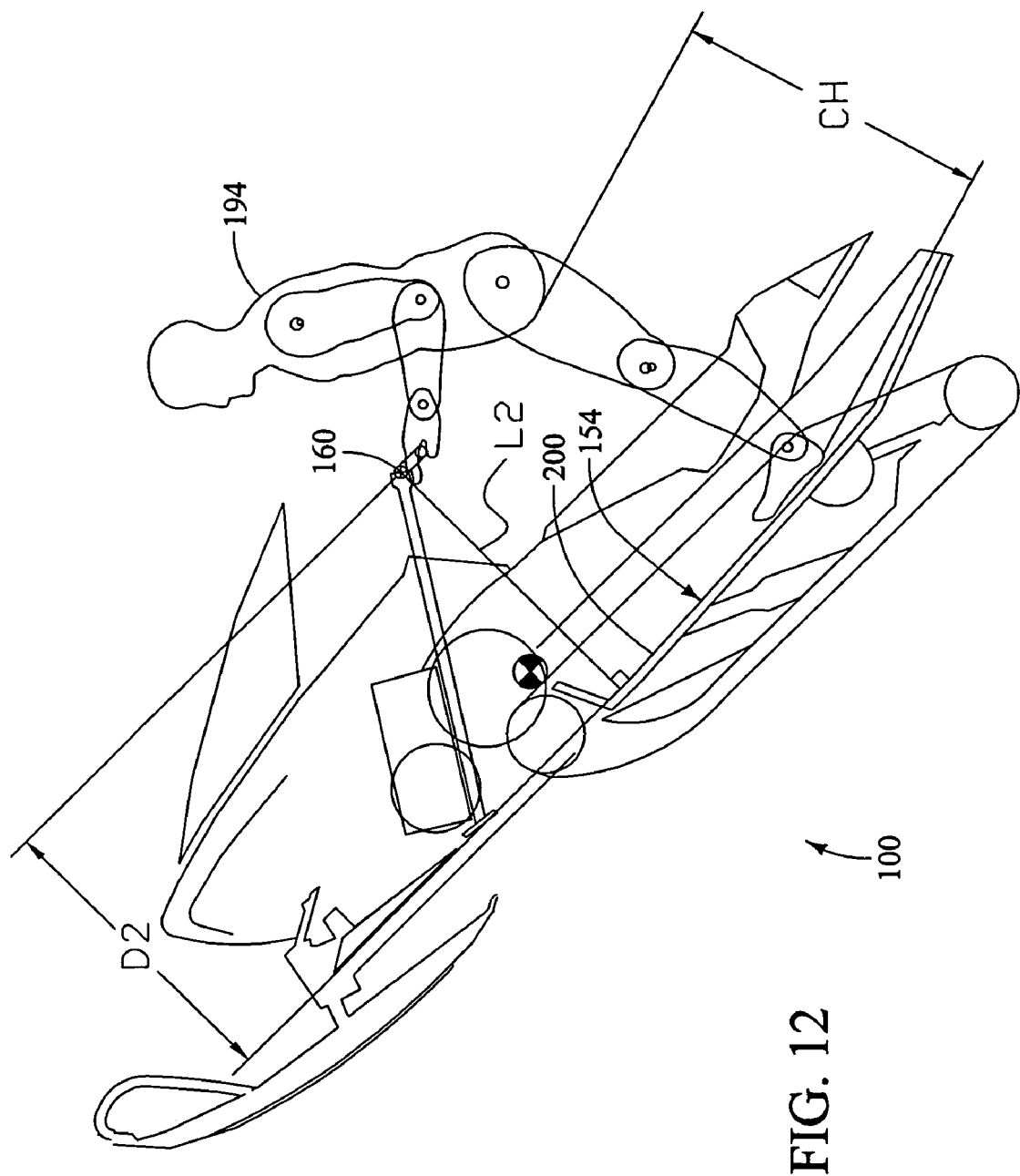
FIG. 12 is a plan view of a snowmobile and a rider.

FIG. 12 is a plan view of a snowmobile 100 and a rider 194. In the embodiment of FIG. 12, rider 194 is assuming a forward leaning posture. Rider 194 may assume the forward leaning posture of FIG. 12, for example, to control the attitude of snowmobile 100. In FIG. 12, it may be appreciated that running boards 154 of snowmobile 100 and control point 160 of snowmobile 100 are separated by a distance D2. In FIG. 12, distance D2 is measured along a plane P2 that intersects control point 160 and is normal to a surface 200 of running boards 154. A crotch height CH of rider 194 is illustrated in FIG. 12. In some embodiments of the present invention, distance D2 is greater than a crotch height of a pre-selected rider.

Figure 13:
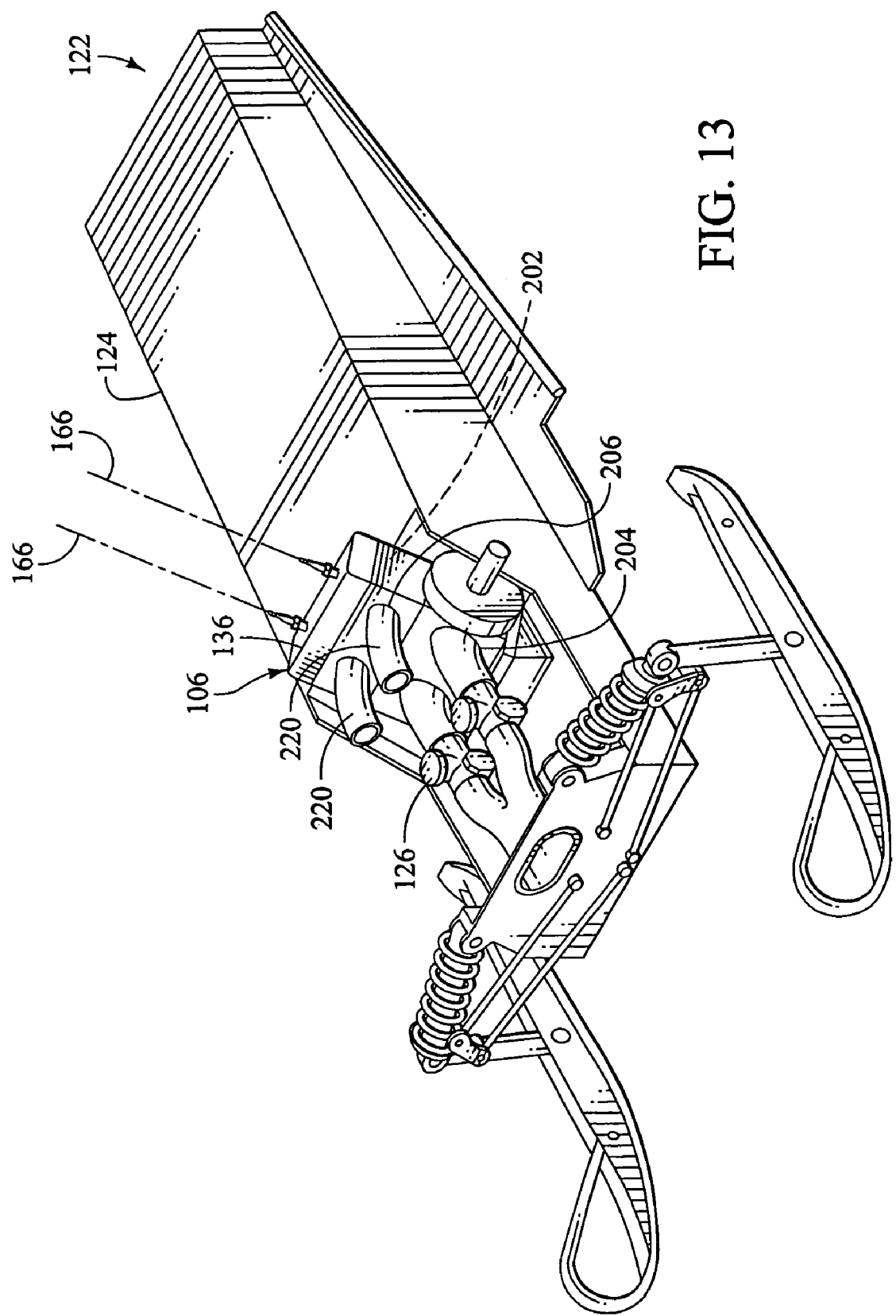
FIG. 13 is a perspective view of an assembly in accordance with an exemplary embodiment of the present invention.

FIG. 13 is a perspective view of an assembly in accordance with an exemplary embodiment of the present invention. The assembly of FIG. 13 includes an engine 106 that is coupled to a frame 124 defining a tunnel 122. Engine 106 is preferably operatively coupled to a drive track for propelling a snowmobile in accordance with the present invention. Engine 106 includes a cylinder block 136 defining a plurality of cylinder bores 202 each having a cylinder bore axis 166.

Cylinder block 136 of engine 106 also defines a plurality of inlet ports 204 and a plurality of exhaust ports 206. In the embodiment of FIG. 13, air enters engine 106 through inlet ports 204 and exhaust gases exit engine 106 via exhaust ports 206. In FIG. 13 it may be appreciated that inlet ports 204 and exhaust ports 206 are both disposed on the same side of a plane defined by the cylinder bore axes 166 of engine 106. In FIG. 13, a plurality of exhaust pipes 220 are shown extending away from engine 106. Each exhaust pipe preferably fluidly communicates with an exhaust port 206 of engine 106. The assembly of FIG. 13 also includes a plurality of throttle bodies 126. Each throttle body 126 preferably fluidly communicates with an inlet port 204 engine 106. In FIG. 13 it may be appreciated that engine 106 is generally disposed at an angle relative to vertical so that cylinder bore axes 166 of engine 106 extend generally upwardly and rearwardly.

Figure 14:
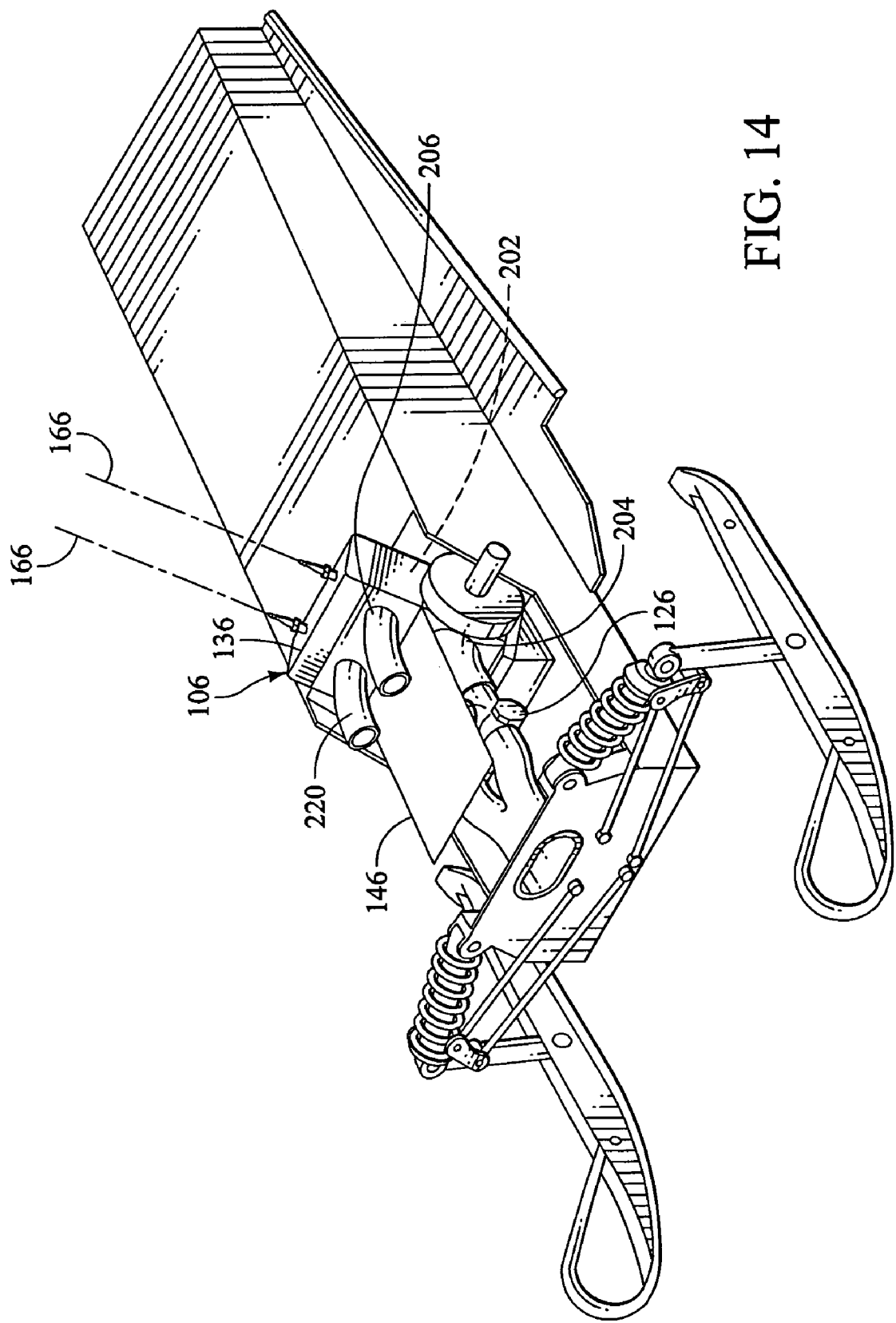
FIG. 14 is a perspective view of an assembly in accordance with an exemplary embodiment of the present invention.

FIG. 14 is a perspective view of an assembly in accordance with an exemplary embodiment of the present invention. The assembly of FIG. 14 comprises an engine 106 including a cylinder block 136 defining cylinder bores 202 having a cylinder bore axes 166. In the embodiment of FIG. 14, air enters cylinder bores 202 via throttle bodies 126 and inlet ports 204. Exhaust gases may exit cylinder bores 202 via exhaust ports 206 and exhaust pipes 220 which fluidly communicate with exhaust ports 206.

In the embodiment of FIG. 14, air inlet ports 204 and exhaust ports 206 are both disposed on a front side of engine 106. Also in the embodiment of FIG. 14, a heat shield 146 is disposed between air inlet ports 204 and exhaust ports 206. In FIG. 14 it may be appreciated that heat shield 146 extends between throttle bodies 126 and exhaust pipes 220.

Figure 15:
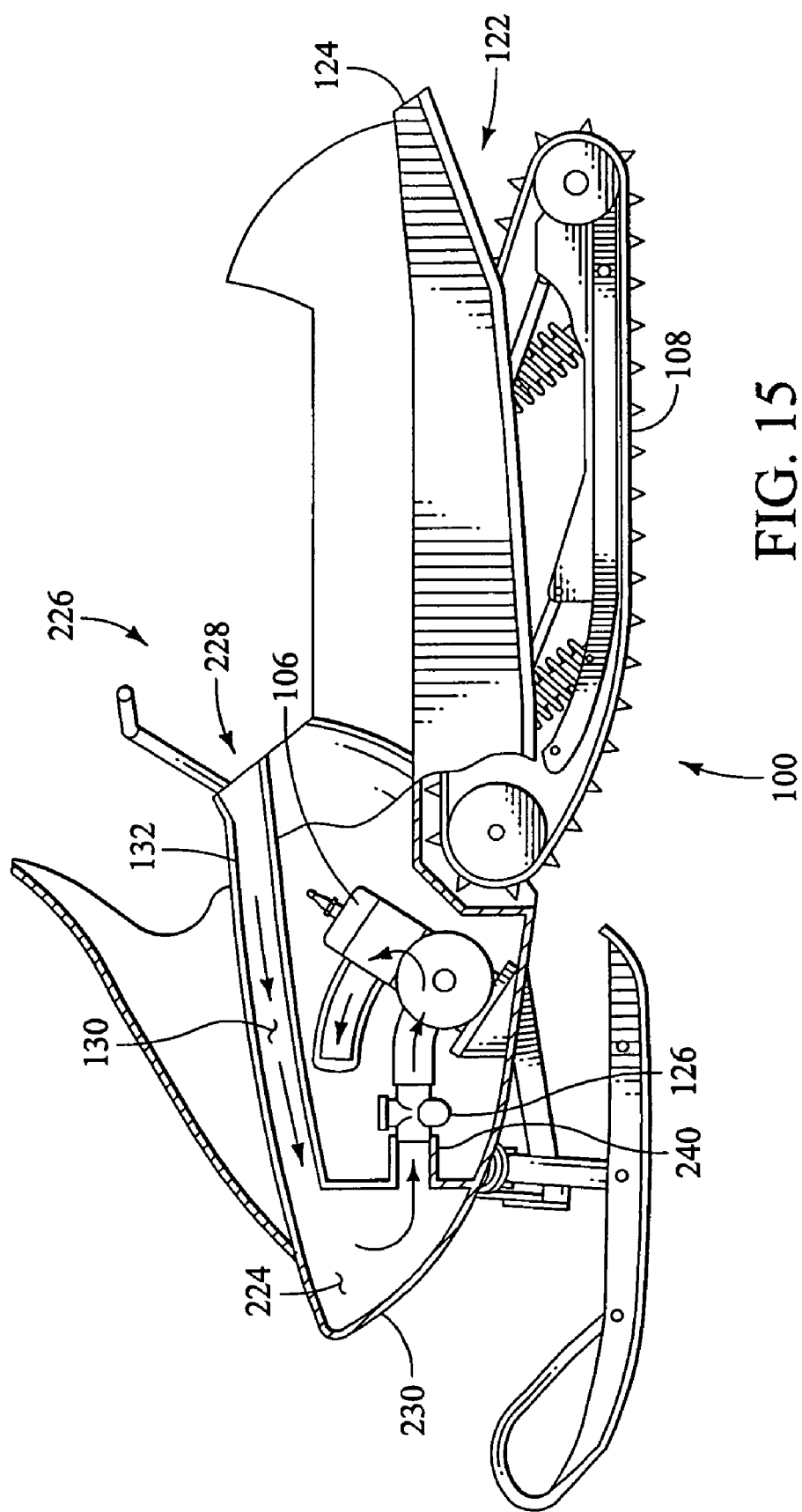
FIG. 15 is a plan view of a snowmobile in accordance with an exemplary embodiment of the present invention.

FIG. 15 is a plan view of a snowmobile 100 in accordance with an exemplary embodiment of the present invention. In FIG. 15 it may be appreciated that snowmobile 100 includes an engine 106 that may be operatively coupled to a drive track 108 for propelling snowmobile 100. In the embodiment of FIG. 15, drive track 108 of snowmobile 100 is partially disposed within a tunnel 122 defined by a frame 124 of snowmobile 100.

In the embodiment of FIG. 15, a throttle body 126 is fluidly coupled to engine 106. Air entering engine 106 may flow through throttle body 126. Throttle body 126 is coupled to a chamber 224 defined by a lightweight shell 230. Filter media may be disposed within chamber 224 for filtering incoming air. Chamber 224 is fluidly coupled to an air plenum 130 defined by a hood 132 of snowmobile 100.

In the embodiment of FIG. 15, air plenum 130 is configured such that air is drawn from an area proximate a rider's area 226 of snowmobile 100 and directed to chamber 224. In FIG. 15, it may be appreciated that air plenum 130 communicates with an inlet 228 defined by a rear portion of hood 132.

Figure 16:
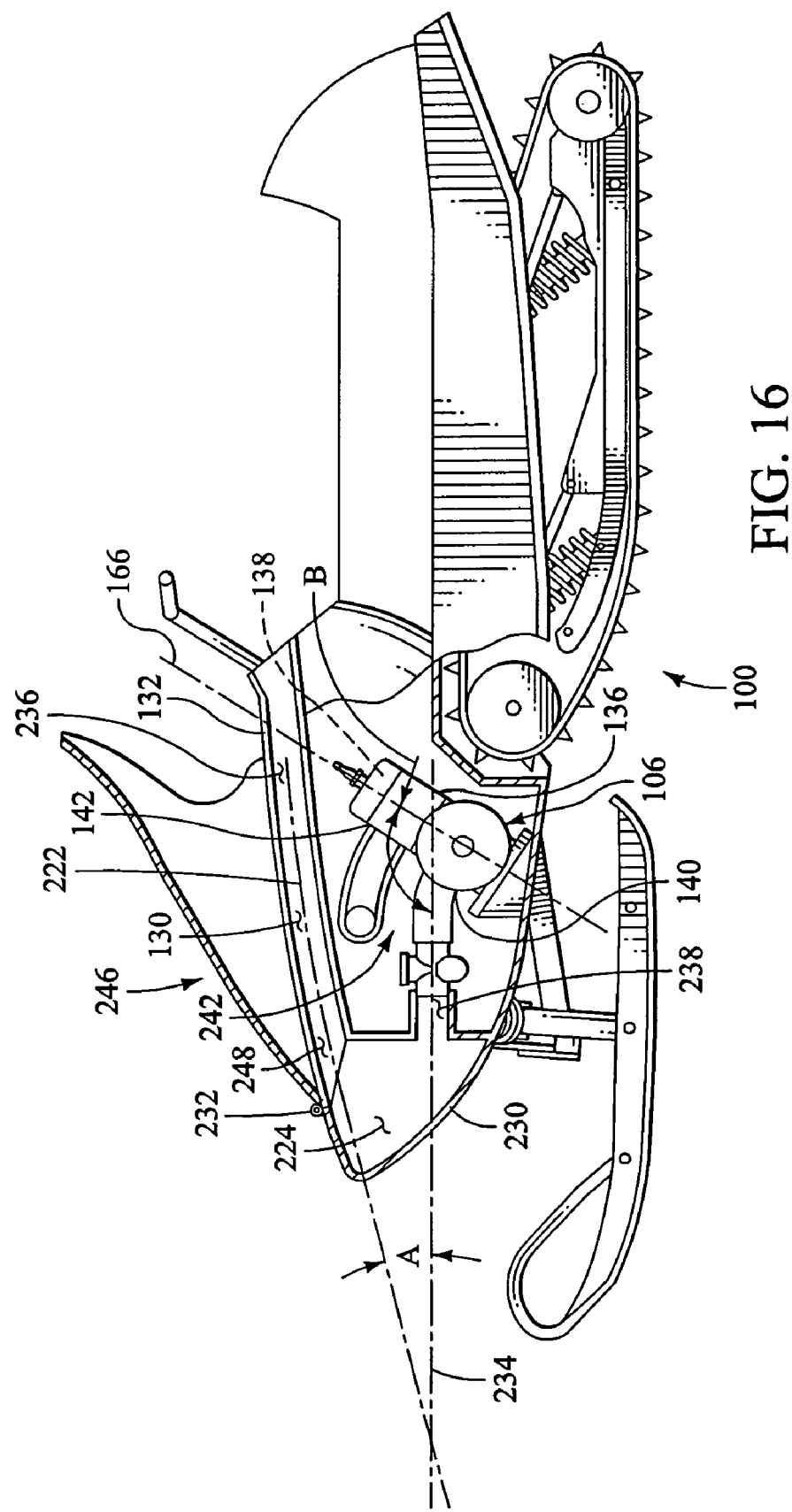
FIG. 16 is a plan view of a snowmobile in accordance with the present invention.

FIG. 16 is a plan view of a snowmobile 100 in accordance with the present invention. Snowmobile 100 of FIG. 16 includes a lightweight shell 230 defining a chamber 224. In the embodiment of FIG. 16 a hood 132 of snowmobile 100 is rotatably coupled to lightweight shell 230 at a hinge 232. Hood 132 is preferably supported so that it can be moved between an open position and a closed position. In the embodiment of FIG. 16, hood 132 is shown in the closed position.

In FIG. 16, it may be appreciated that when hood 132 is in the closed position, chamber 224 communicates with a plenum 130 defined by hood 132. Air may enter chamber 224 after traveling along an entrance path 236 that extends along a longitudinal axis 222 of plenum 130. In the embodiment of FIG. 16, air exiting chamber 224 travels along an exit path 238 extending through a conduit 240 and a throttle body 126. A throttle body axis 234 of throttle body 126 is shown in FIG. 16. In the embodiment of FIG. 16, conduit 240 is disposed in a substantially coaxial arrangement with throttle body 126.

In FIG. 16, it may be appreciated that longitudinal axis 222 of plenum 130 and throttle body axis 234 of throttle body 126 intersect to define an angle A. In the embodiment of FIG. 16, angle A is an acute angle. Embodiments of snowmobile 100 are possible in which longitudinal axis 222 of plenum 130 and throttle body axis 234 of throttle body 126 are generally parallel to one another.

It is to be appreciated that hinge 232, the walls of lightweight shell 230, and the walls of hood 132 are not necessarily drawn to scale in FIG. 16. For example, some of these elements may be depicted in a relatively enlarged manner for purposes of illustration. In FIG. 16 it may be appreciated that of throttle body axis 234 intersects a cylinder bore axis 166 to define an angle B. Cylinder bore axis 166 extends through a cylinder bore 138 defined by a cylinder block 136 of an engine 106 of snowmobile 100. In the embodiment of FIG. 16, angle B is an obtuse angle.

Cylinder block 136 also defines an air inlet port 140 and an exhaust port 142. Air may enter a cylinder bore 138 of engine 106 via air plenum 130, chamber 224, conduit 240, throttle body 126 and inlet port 144. Exhaust gases may exit cylinder bore 138 via exhaust port 142 and an exhaust pipe 148 which fluidly communicates with exhaust port 142. In the embodiment of FIG. 16, air inlet port 140 and exhaust port 142 are both disposed on a front side 242 of engine 106.

In the embodiment of FIG. 16, hood 132 and shell 230 cooperate to form a snowmobile body 246. In the embodiment of FIG. 16, air enters plenum 130 at a location proximate the rear of snowmobile body 246, then travels in a forward direction along entrance path 236 to an extreme front end of snowmobile body 246. The air then travels in a rearward direction along exit path 238 toward engine 106. Entrance path 236 and exit path 238 cooperate to form an air path 248. With reference to FIG. 16, it may be appreciated that air traveling through air path 248 travels a distance greater than an overall length of hood 132. In some embodiments of the present invention, air traveling through air path 248 travels a distance greater than an overall length of snowmobile body 246.

Figure 17:
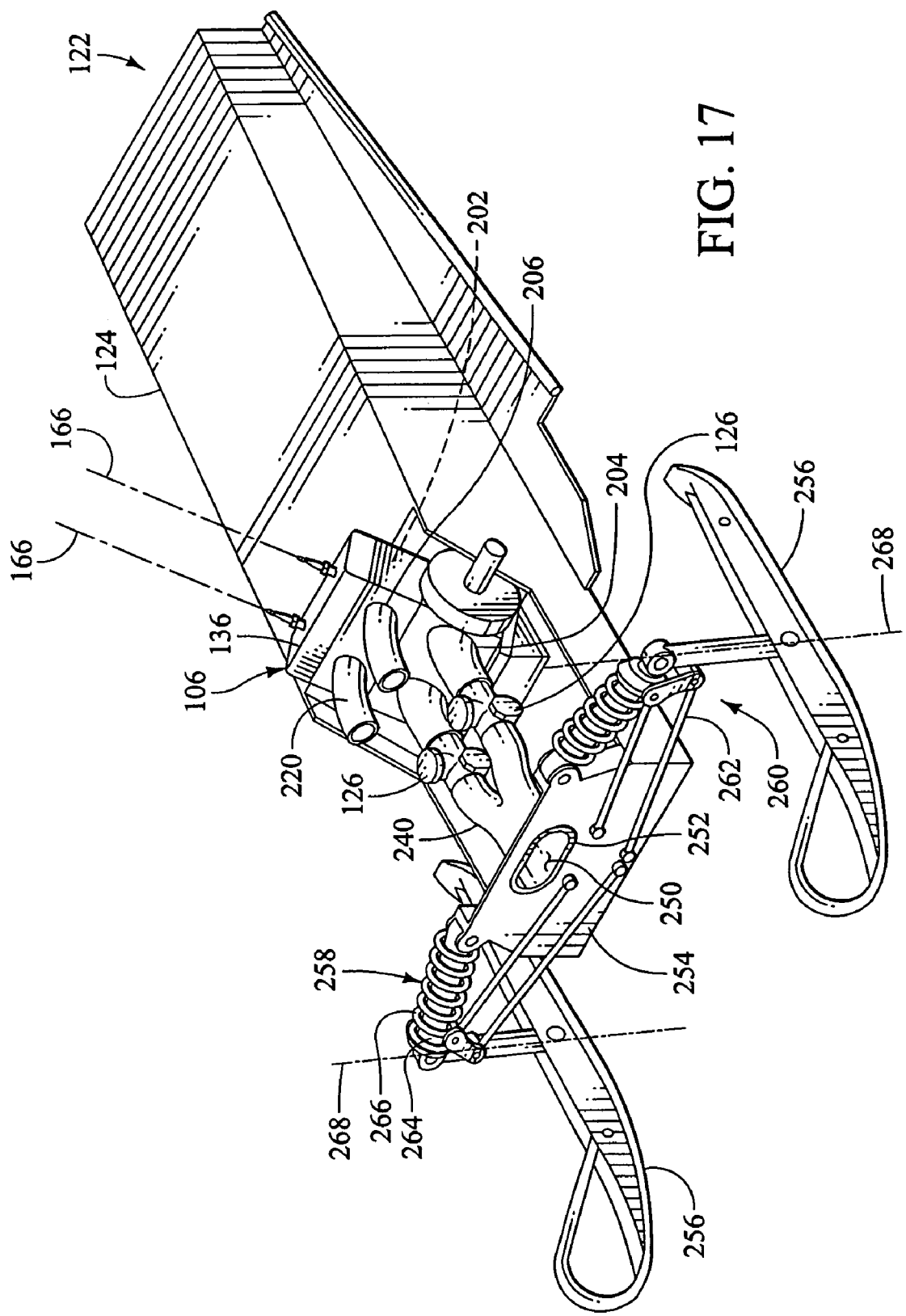
FIG. 17 is a perspective view of an assembly in accordance with an exemplary embodiment of the present invention.

FIG. 17 is a perspective view of an assembly in accordance with an exemplary embodiment of the present invention. The assembly of FIG. 17 includes an engine 106 that is coupled to a frame 124 defining a tunnel 122. Engine 106 may be operatively coupled to a drive track for propelling a snowmobile in accordance with the present invention. Engine 106 includes a cylinder block 136 defining a plurality of cylinder bores 202 each having a cylinder bore axis 166.

Cylinder block 136 of engine 106 also defines a plurality of inlet ports 204 and a plurality of exhaust ports 206. In the embodiment of FIG. 17, air enters engine 106 through inlet ports 204 and exhaust gases exit engine 106 via exhaust ports 206. In FIG. 17 it may be appreciated that inlet ports 204 and exhaust ports 206 are both disposed on the same side of a plane defined by the cylinder bore axis 166 of engine 106. In FIG. 17, a plurality of exhaust pipes 220 are shown extending away from engine 106.

The assembly of FIG. 17 also includes a plurality of throttle bodies 126. Each throttle body 126 preferably fluidly communicates with an inlet port 204 of engine 106. In FIG. 17 it may be appreciated that engine 106 is generally disposed at an angle relative to vertical so that each cylinder bore axis 166 of engine 106 extend generally upwardly and rearwardly.

The assembly of FIG. 17 includes a conduit 240 that is shown extending away from throttle bodies 126. Conduit 240 defines a lumen 250 that fluidly communicates with engine 106 via throttle bodies 126. In FIG. 17, conduit 240 can be seen extending through an aperture 252 defined by a shock tower 254 of frame 124.

The assembly of FIG. 17 also includes a plurality of skis 256. Each ski 256 is supported by a front suspension 260. In the embodiment of FIG. 17, each front suspension 260 includes a plurality of suspension arms 262. Each front suspension 260 also includes a spring assembly 258. In the embodiment of FIG. 17, each spring assembly 258 includes a shock absorber 264 and a spring 266 that is disposed about shock absorber 264. It is to be appreciated that various embodiments of suspension arms 262 are possible without deviating from the spirit and scope of the present invention. Examples of suspension arms which may be suitable in some applications include A-arms and radius rods. In the embodiment of FIG. 17, each ski 256 is preferably free to rotate about a ski axis 268.

Figure 18:
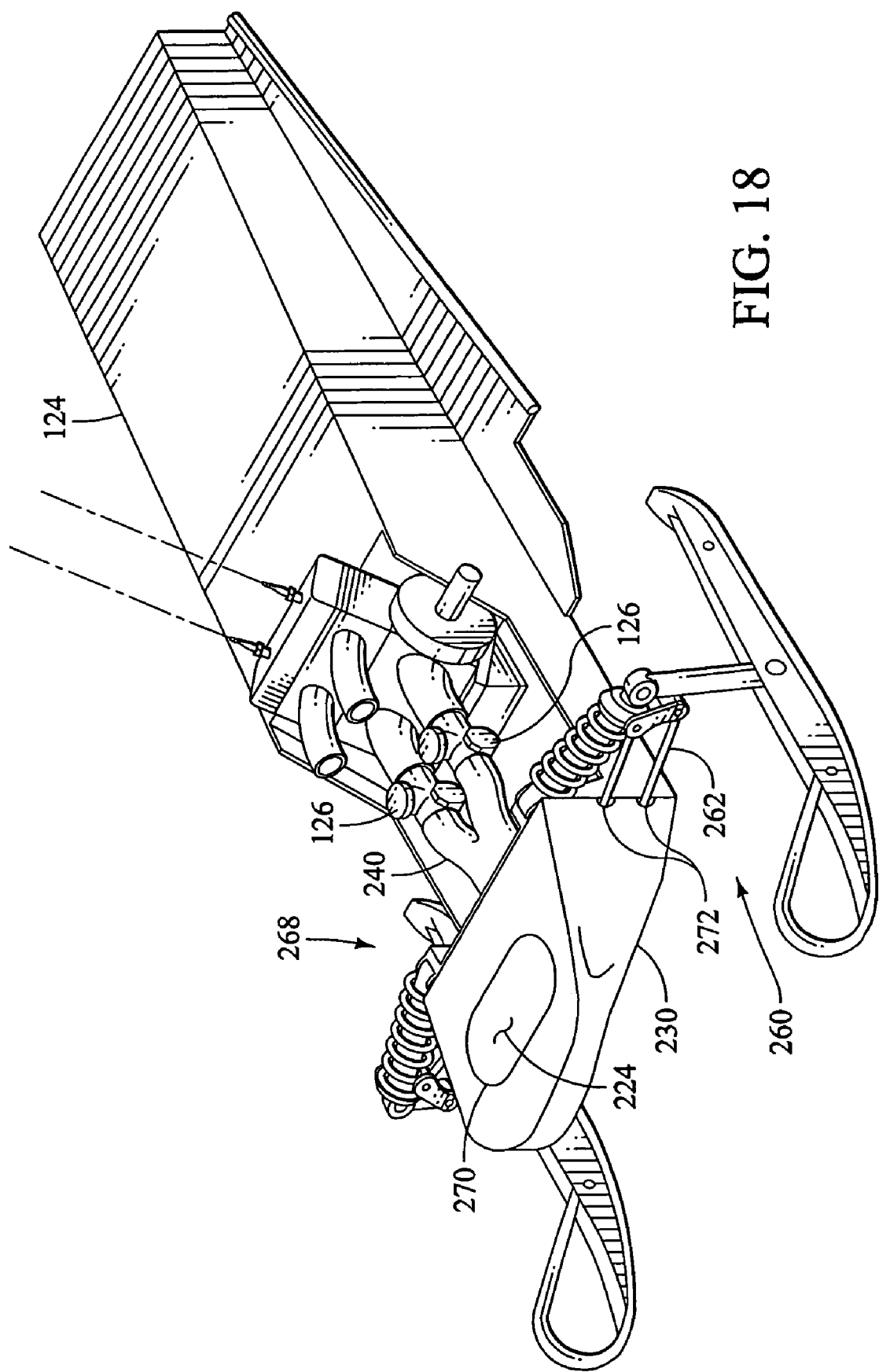
FIG. 18 is a perspective view of an assembly including frame of the previous figure and a lightweight shell that is preferably fixed to a front portion of frame.

FIG. 18 is a perspective view of an assembly including frame 124 of the previous figure and a lightweight shell 230 that is preferably fixed to a front portion 268 of frame 124.

In FIG. 18, it may be appreciated that lightweight shell 230 defines a chamber 224 and an opening 270 communicating with chamber 224. Opening 270 and chamber 224 preferably also communicate with engine 106 via a conduit 240 and a plurality of throttle bodies 126.

In FIG. 18 it may be appreciated that suspension arms 262 of front suspension 260 have been received within a plurality of channels 272 defined by lightweight shell 230. In a preferred embodiment, channels 272 are preferably dimensioned to receive suspension arms 262 of suspension 274.

Figure 19:
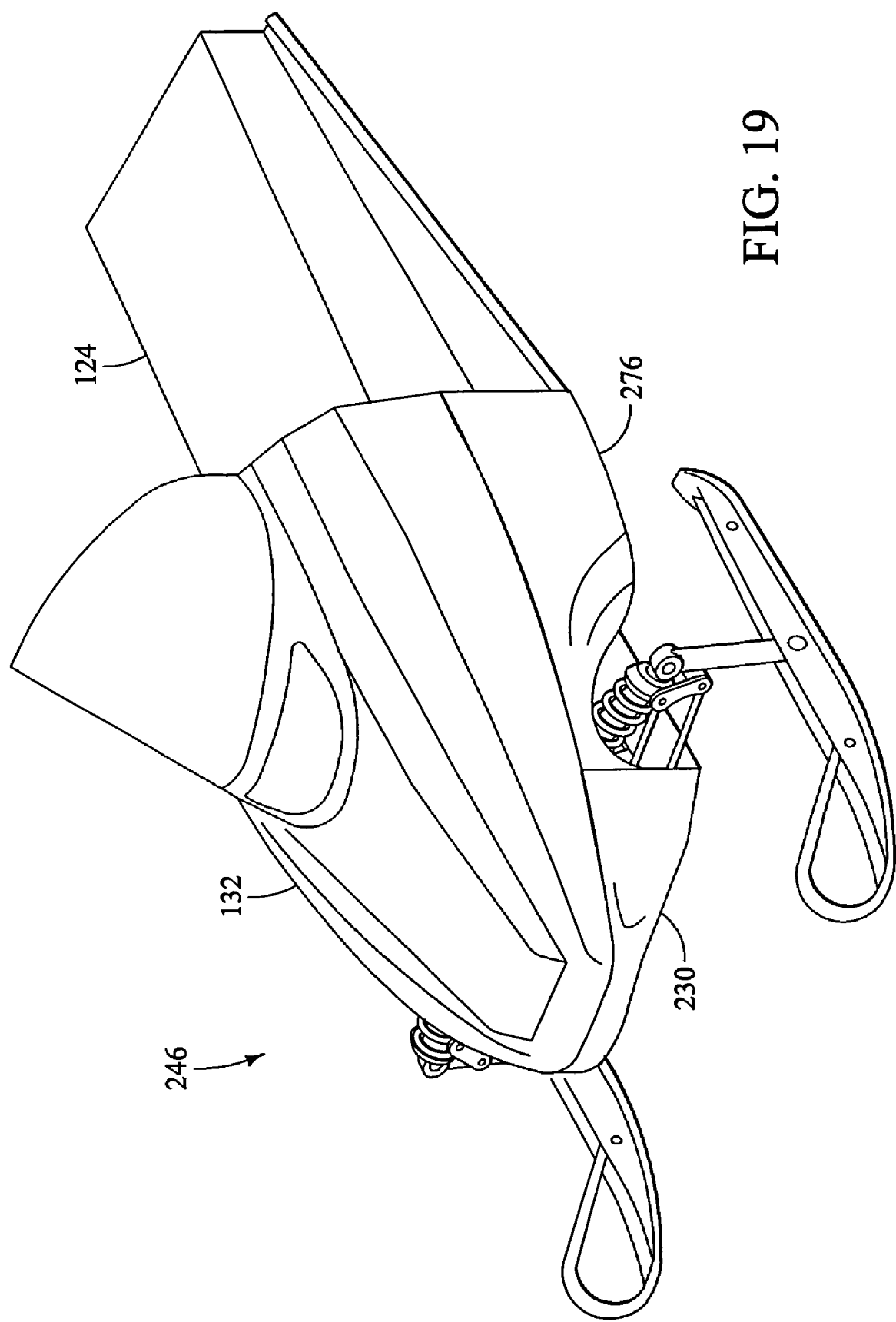
FIG. 19 is a perspective view of an assembly including frame and lightweight shell shown in the previous figure.

FIG. 19 is a perspective view of an assembly including frame 124 and lightweight shell 230 shown in the previous figure. Additionally, the assembly of FIG. 19 includes a snowmobile hood 132 and a belly plate 276. Hood 132, lightweight shell 230, and belly plate 276 cooperate to form a snowmobile body 246.

Figure 20:
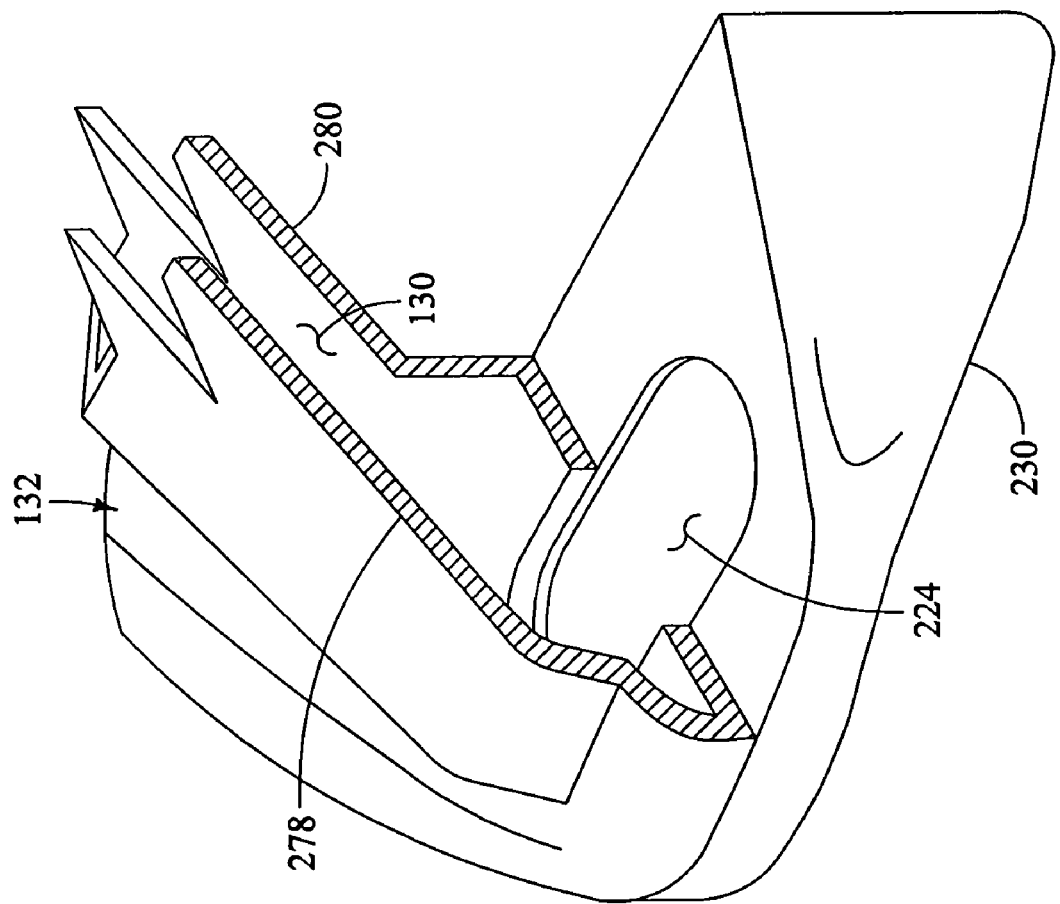
FIG. 20 is a cut away perspective view of an assembly including lightweight shell and hood shown in the previous figure.

FIG. 20 is a cut away perspective view of an assembly including lightweight shell 230 and hood 132 shown in the previous figure. In FIG. 20, it may be appreciated that hood 132 comprises an outer wall 278 and an inner wall 280 defining a plenum 130. In FIG. 20 it may also be appreciated that lightweight shell 230 defines a chamber 224 fluidly communicating with plenum 130 defined by outer wall 278 and inner wall 280 of hood 132.

Figure 21:
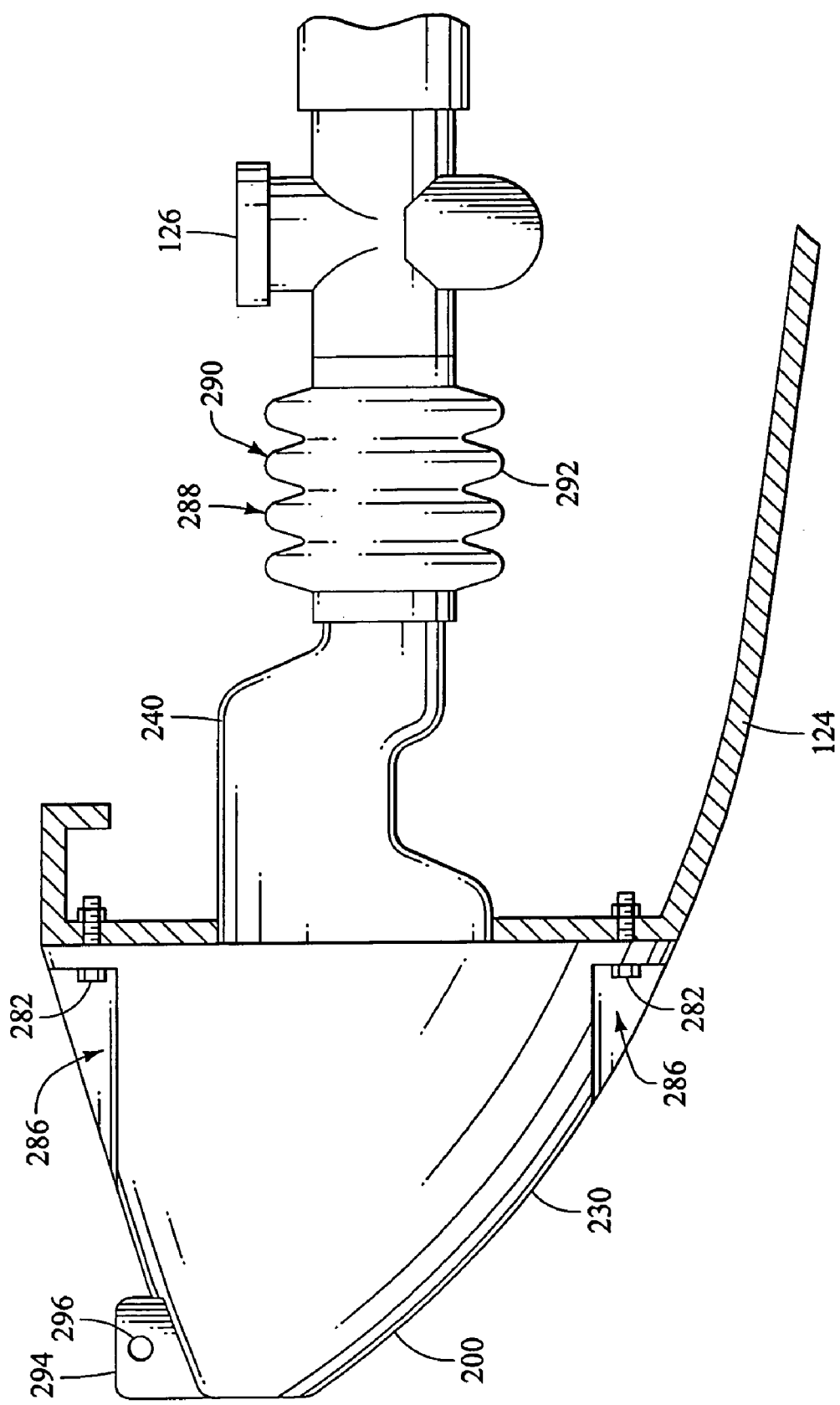
FIG. 21 is a plan view of an assembly including a lightweight shell in accordance with an exemplary embodiment of the present invention.

FIG. 21 is a plan view of an assembly including a lightweight shell 230 in accordance with an exemplary embodiment of the present invention. In the embodiment of FIG. 21, lightweight shell 230 is fixed to a frame 124 by a plurality of fasteners 282. Lightweight shell 230 includes mounting holes dimensioned to receive a body portion of each fastener 284. Lightweight shell 230 also defines a plurality of notches 286 dimensioned to receive a head portion of each fastener 284. In some embodiments, notches 286 are dimensioned to receive a tool which is adapted to engage the head portion of each fastener 284. Various fasteners may be used without deviating from the spirit and scope of the present invention. Examples of fasteners which may be suitable in some applications include threaded fasteners (e.g., screws) and rivets.

In FIG. 21, a conduit 240 is shown fixed to lightweight shell 230. In the embodiment of FIG. 21, conduit 240 and lightweight shell 230 are preferably formed from a single piece of material. Conduit 240 and lightweight shell 230 may be formed, for example, from a polymeric material using a rotational molding process.

A cavity defined by lightweight shell 230 preferably communicates with a throttle body 126 via conduit 240. In FIG. 21, it may be appreciated that a flexible coupling 288 is interposed between conduit 240 and throttle body 126. Flexible coupling 288 preferably acts to reduce the level of vibrations transmitted between throttle body 126 and lightweight shell 230. In some embodiments, flexible coupling 288 may comprise an elastomeric material. In the embodiment of FIG. 21, flexible coupling 288 comprises a bellows 290 having a plurality of convolutions 292.

Lightweight shell 230 includes a mounting flange 294 defining a hole 296. In some embodiments, hole 296 is dimensioned to receive a pin for rotatably coupling a snowmobile hood to lightweight shell 230. Lightweight shell 230 also includes an outer surface 200. In the embodiment of FIG. 21, outer surface 200 has a generally curved shape. In some embodiments of the present invention, outer surface 200 may have a generally convex shape. A shell having a generally curved shape may aid in gliding over deep snow.

Figure 22:
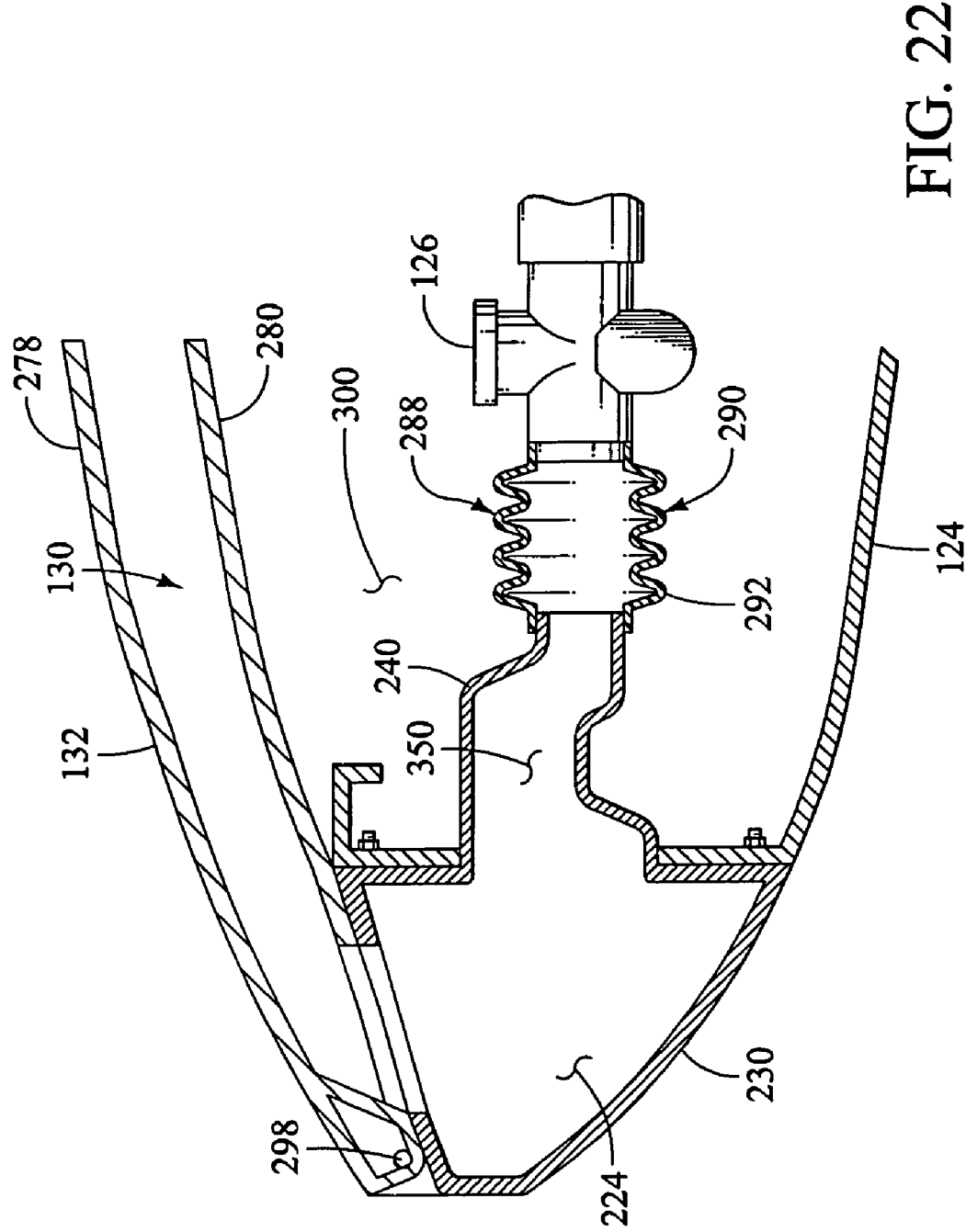
FIG. 22 is a cross sectional view of an assembly including a lightweight shell in accordance with an exemplary embodiment of the present invention.

FIG. 22 is a cross sectional view of an assembly including a lightweight shell 230 in accordance with an exemplary embodiment of the present invention. In the embodiment of FIG. 22; a hood 132 is rotatably coupled to lightweight shell 230 at a pin 298 so that hood 132 can be moved between an open position and a closed position. In the embodiment of FIG. 22, hood 132 is in a closed position. Hood 132 and a frame 124 define an engine compartment 300. Hood 132 may be moved to an open position, for example, when it is desirable to gain access to an engine disposed in engine compartment 300.

In the embodiment of FIG. 22, a chamber 224 defined by lightweight shell 230 communicates with a throttle body 126 via a lumen 350 defined by a conduit 240. In FIG. 22, it may be appreciated that a flexible coupling 288 is interposed between conduit 240 and throttle body 126. In the embodiment of FIG. 22, flexible coupling 288 comprises a bellows 290 having a plurality of convolutions 292.

Hood 132 includes an inner wall 280 and an outer wall 278. The walls of hood 132 define a plenum 130 which communicates with chamber 224 at least When hood 132 is in the closed position shown in FIG. 22.

Figure 23:
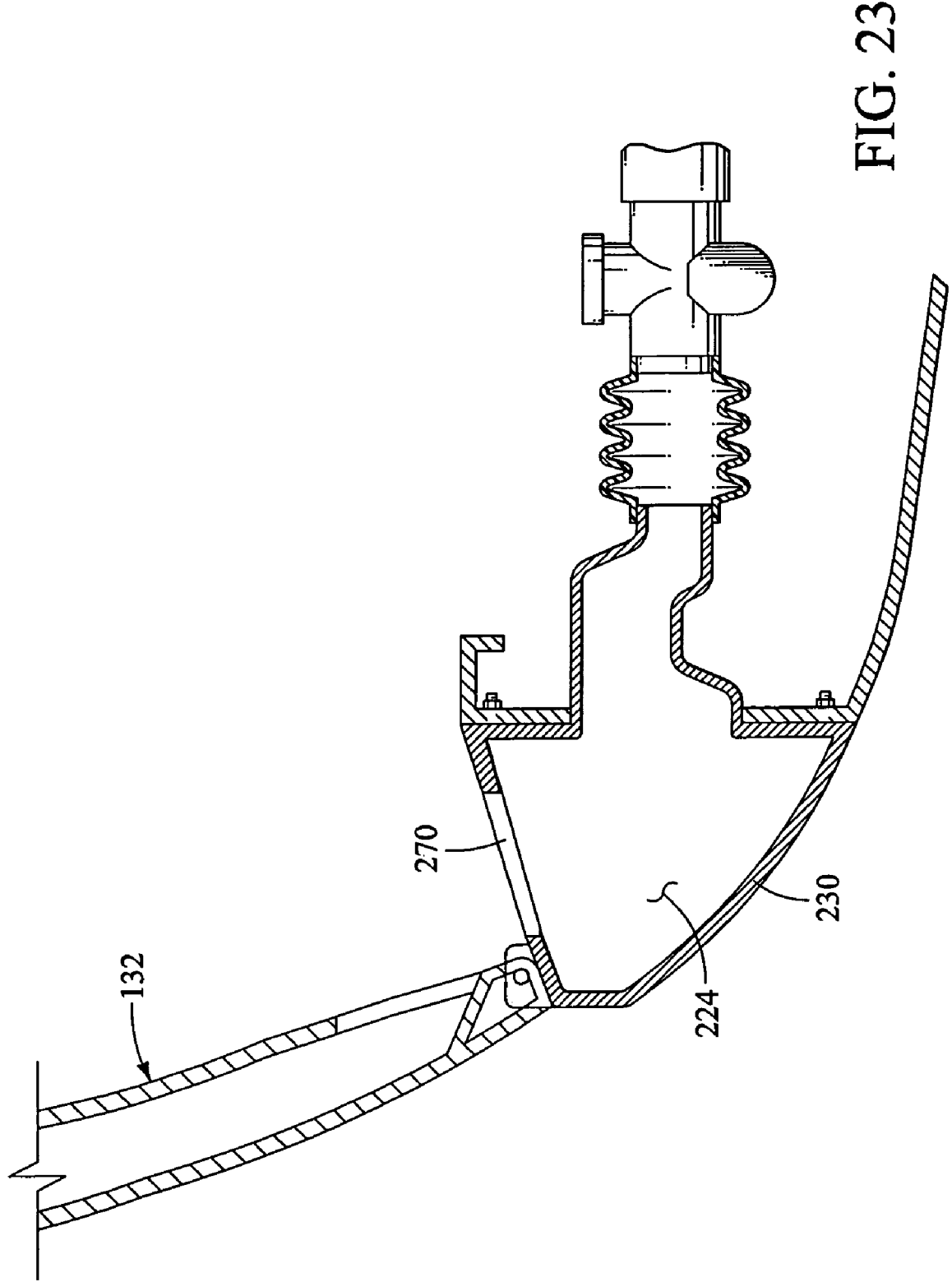
FIG. 23 is an additional cross sectional view of the assembly of the previous figure.

FIG. 23 is an additional cross sectional view of the assembly of the previous figure. In the embodiment of FIG. 23, hood 132 is disposed in an open position. In FIG. 23, it may be appreciated that chamber 224 defined by lightweight shell 230 may be accessed through an opening 270 when hood 132 is in the open position.

Figure 24:
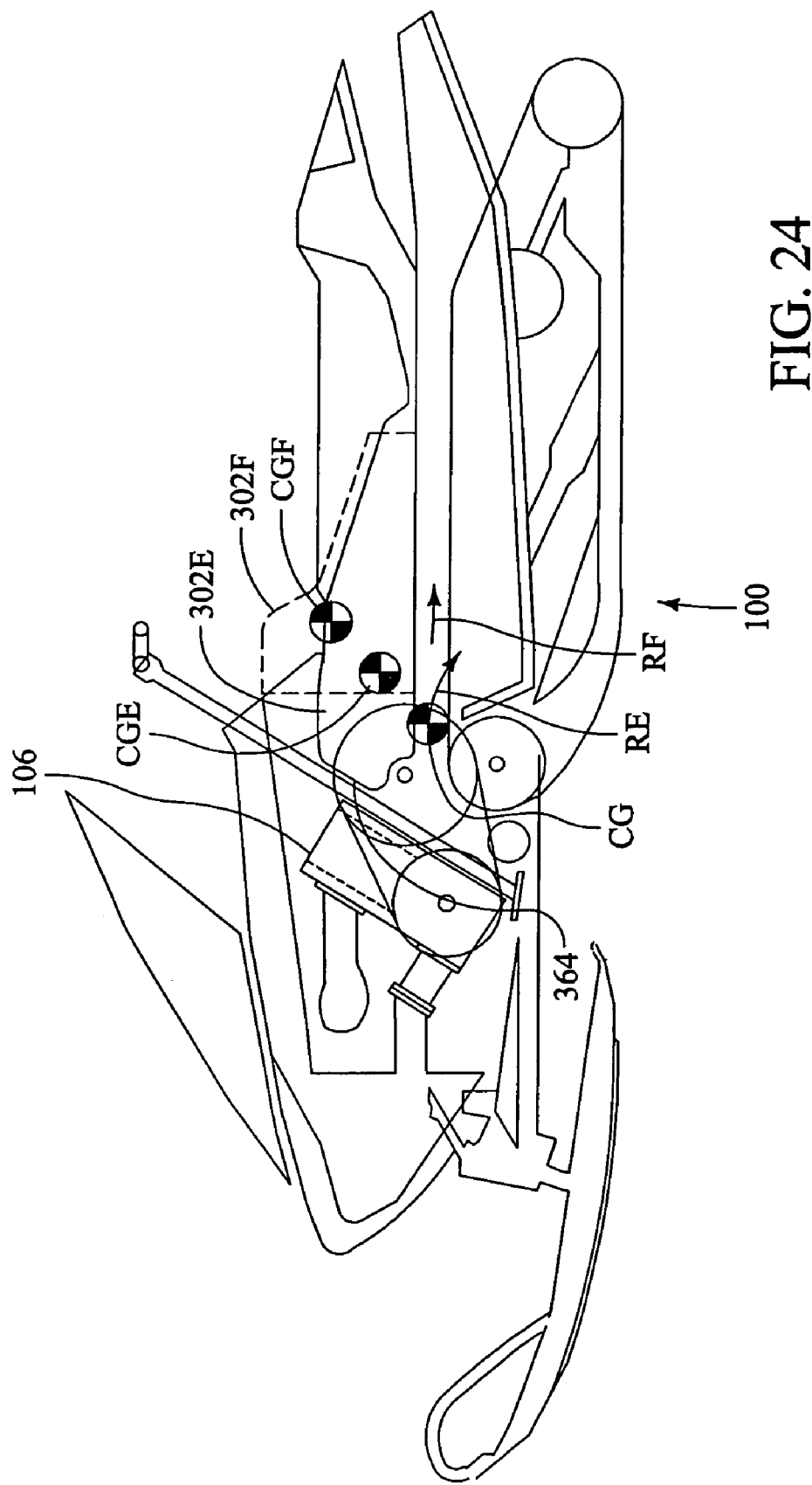
FIG. 24 is an additional plan view of snowmobile.

FIG. 24 is a plan view of snowmobile 100. In FIG. 24 it may be appreciated that snowmobile 100 includes a fuel tank 302 having a fuel tank center of gravity CGE. In the embodiment of FIG. 24, fuel tank center of gravity CGE is disposed at a first radius RE relative to center of gravity CG of snowmobile 100.

In FIG. 24 a different fuel tank 302 is illustrated using dashed lines. Different fuel tank 302 has a different fuel tank center of gravity CGF. In FIG. 24 it may be appreciated that different fuel tank center of gravity CGF lies at a second radius RF relative to center of gravity CG of snowmobile 100. In the embodiment of FIG. 24, radius RF is greater than radius RE, thus snowmobile 100 would have a greater polar moment of inertia if fuel tank 302E was replaced with different fuel tank 302F.

In the embodiment of FIG. 24, engine 106 and fuel tank 302E are both positioned proximate center of gravity CG of snowmobile 100 providing a relatively small polar moment of inertia (PMI). In FIG. 24, it may be appreciated that a front wall 364 of fuel tank 302E is disposed proximate engine 106.

Figure 25:
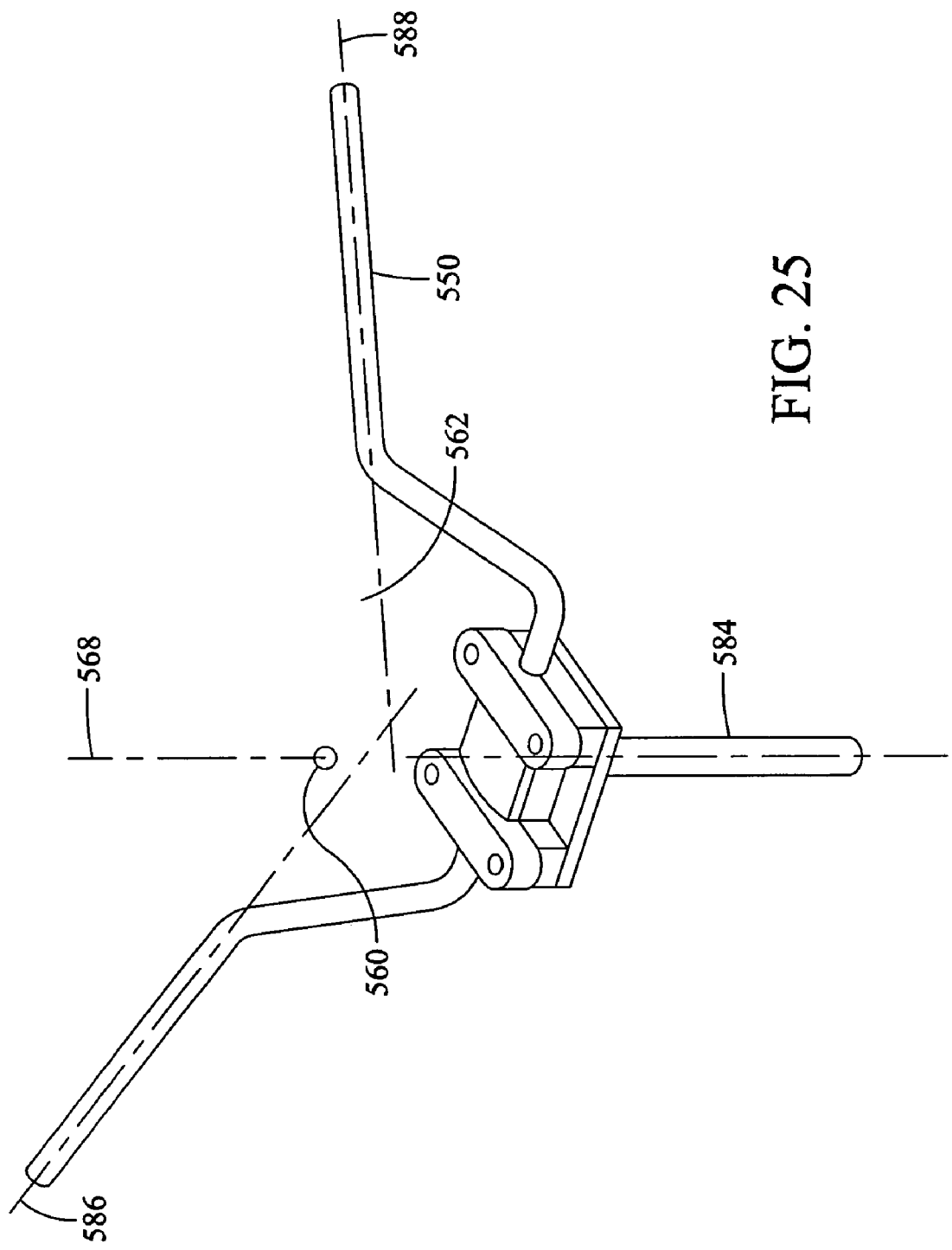
FIG. 25 is a perspective view of a handle bar assembly including a handlebar that is coupled to a shaft.

FIG. 25 is a perspective view of a handle bar assembly including a handlebar 550 that is coupled to a shaft 584. A steering axis 568 is shown in FIG. 25. A snowmobile in accordance with an exemplary embodiment of the present invention may include handlebar 550 and shaft 584. This snowmobile may be configured so that handlebar 550 and shaft 584 rotate about steering axis 568. Handle bar 550 includes a first grip portion and a second grip portion. A first grip axis 586 and a second grip axis 588 are shown in FIG. 25. First grip axis 586 and second grip axis 588 define a grip plane 562. A control point 560 is disposed at the point where steering axis 568 intersects grip plane 562.

Handle bar 550 may form a portion of the human-to-machine interface of a snowmobile in accordance with an exemplary embodiment of the present invention. This human-to-machine interface may also include, for example, a seat, a pair of running boards, and a pair of toe stops. The operator of such a snowmobile may control the snowmobile by applying forces to handlebar 550, the seat, the running boards, and the toe stops. The operator of the snowmobile may also control the snowmobile by assuming various postures in which the operators weight is distributed over handlebar 550, the running boards, the toe stops, and the seat in varying degrees.

In some exemplary embodiments of the present invention, a toe stop intersects a running board at an intersection. In these exemplary embodiments, control point 560 may be disposed at a pre-selected distance from the intersection. In certain embodiments, the distance between control point 160 and the intersection may be greater than a crotch height of a pre-selected rider. Measurements from various pre-selected riders may be used without deviating from the spirit and scope of the present invention. Examples of pre-selected riders that may be suitable in some applications include an average snowmobile purchaser, a $5^{th}$ percentile female from anthropometric data, and a $95^{th}$ percentile male from anthropometric data.

Figure 27:
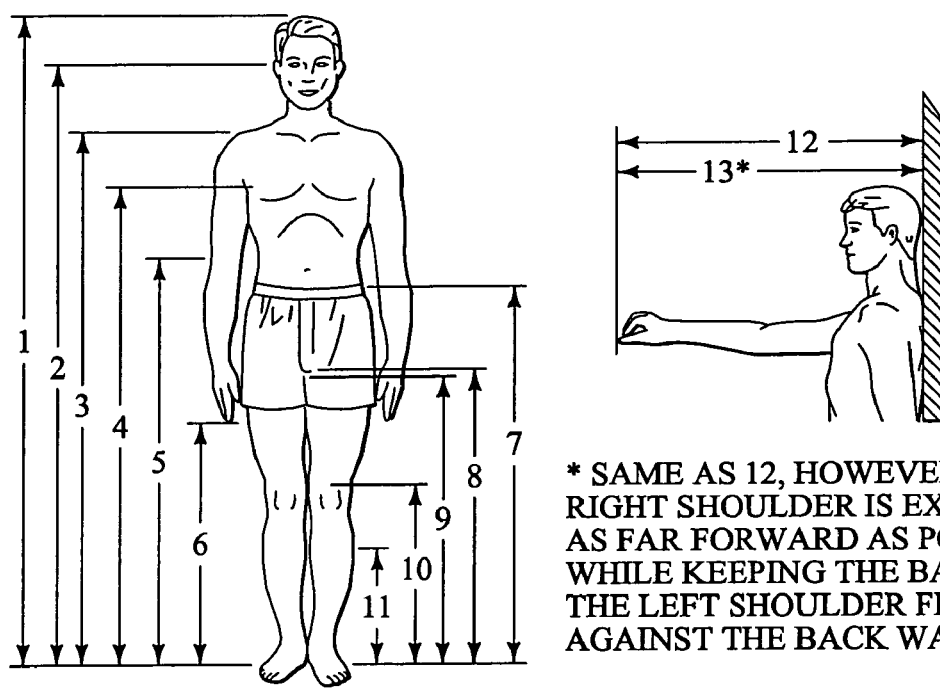
FIG. 27 is an illustration of standing body dimensions that corresponds to the table in FIG. 26.

Anthropometric data from various sources may be utilized without deviating from the spirit and scope of the present invention. One exemplary source of anthropometric data is MIL-STD-1472C. FIG. 26 is a table of standing body dimensions that appears in MIL-STD-1472C. FIG. 27 is an illustration of standing body dimensions that corresponds to the table in FIG. 26. The illustration in FIG. 27 may also be found in MIL-STD-1472C.

Several forms of invention have been shown and described, and other forms will now be apparent to those skilled in art. It will be understood that embodiments shown in drawings and described above are merely for illustrative purposes, and are not intended to limit the scope of invention defined claims which follow.

What is claimed is:

1. A snowmobile comprising:
a chassis;
at least one ski coupled to the chassis by a suspension so that the ski is pivotable about a steering axis;
a shell defining a chamber fluidly communicating with an engine of the snowmobile;
the shell fixed to a front portion the chassis and extending away from the chassis in a forward direction; and
wherein the shell is disposed forward of the steering axis.

2. The snowmobile of claim 1, wherein the shell defines a plurality of channels.

3. The snowmobile of claim 2, wherein at least one of the channels is dimensioned to accept a control arm of the suspension.

4. The snowmobile of claim 1, further including a hood rotatably supported by the shell.

5. The snowmobile of claim 4, wherein the shell has sufficient ridgity to support the weight of the hood when the hood is in an open position.

6. The snowmobile of claim 1, wherein the shell has sufficient flexibility to deflect during a collision for absorbing energy from the collision and for decelerating the snowmobile in a controlled fashion so as to protect the rider from rapid deceleration.

7. The snowmobile of claim 1, where the chassis includes a shock tower defining an aperture sized to receive a conduit fluidly communicating with a chamber defined by the shell.

8. The snowmobile of claim 1, wherein the shell includes a generally curved outer surface for gliding over deep snow.

9. The snowmobile of claim 8, wherein the generally curved outer surface comprises a generally convex surface.

10. A snowmobile comprising:
a chassis;
a shell fixed to a front portion the chassis and extending away from the chassis in a forward direction;
a hood rotatably supported by the shell;
the shell defining a chamber fluidly communicating with an engine of the snowmobile;
the hood including an outer wall and an inner wall;
the walls of the hood defining a plenum; and
the plenum fluidly communicating with the chamber defined by the shell at least when the hood is in a closed position.

11. The snowmobile of claim 10, wherein the chamber defined by the shell may be accessed via an opening in the shell when the hood is in an open position.

12. The snowmobile of claim 10, wherein a longitudinal axis of the plenum and a longitudinal axis of a throttle body of the snowmobile are generally parallel to one another.

13. The snowmobile of claim 10, wherein a longitudinal axis of the plenum and a longitudinal axis of a throttle body of the snowmobile intersect to define an angle.

14. The snowmobile of claim 13, wherein the angle is an acute angle.

15. The snowmobile of claim 10, wherein air enters the engine via an air flow path extending through the plenum and the chamber; and
wherein the air flow path has a length greater than a length of the hood of the snowmobile.

16. The snowmobile of claim 10, further including a flexible coupling interposed between the shell and the engine.

17. The snowmobile of claim 16, wherein the flexible coupling comprises an elastomeric material.

18. The snowmobile of claim 16, wherein the flexible coupling comprises a plurality of convolutions.

19. The snowmobile of claim 16, wherein the flexible coupling comprises a bellows.

20. The snowmobile of claim 10, further comprising at least one ski coupled to the chassis by a suspension such that the ski is rotatable about a steering axis; and
wherein the shell is disposed forward of the steering axis.

21. The snowmobile of claim 10, wherein the plenum communicates with an inlet disposed proximate a rider area of the snowmobile.

22. The snowmobile of claim 10, wherein the shell has sufficient rigidity to support the weight of a hood of the snowmobile when the hood is in an open position.

23. The snowmobile of claim 10, where the chassis includes a shock tower defining an aperture sized to receive a conduit fluidly communicating with the chamber of the shell.

24. The snowmobile of claim 10, wherein the shell includes a generally curved outer surface for gliding over deep snow.

25. The snowmobile of claim 24, wherein the generally curved outer surface comprises a generally convex surface.

26. A snowmobile comprising:
a chassis;
a shell fixed to a front portion the chassis and extending away from the chassis in a forward direction;
an engine coupled to the chassis for propelling the snowmobile; and
the shell defining a chamber fluidly communicating with the engine via a flexible coupling interposed between the shell and the engine.

27. The snowmobile of claim 26, further including a hood having an outer wall and an inner wall; and
the walls of the hood defining a plenum communicating with the chamber.

28. The snowmobile of claim 27, wherein a longitudinal axis of the plenum and a longitudinal axis of a throttle body of the snowmobile are generally parallel to one another.

29. The snowmobile of claim 27, wherein a longitudinal axis of the plenum and a longitudinal axis of a throttle body of the snowmobile intersect to define an angle.

30. The snowmobile of claim 29, wherein the angle is an acute angle.

31. The snowmobile of claim 26, wherein air enters the engine via an air flow path extending through the plenum and the chamber; and wherein the air flow path has a length greater than a length of the hood of the snowmobile.

32. The snowmobile of claim 26, wherein the plenum communicates with an inlet disposed proximate a rider area of the snowmobile.

33. The snowmobile of claim 26, where the chassis includes a shock tower defining an aperture sized to receive a conduit fluidly communicating with the chamber of the shell.

34. The snowmobile of claim 26, wherein the shell includes a generally curved outer surface for gliding over deep snow.

35. The snowmobile of claim 34, wherein the generally curved outer surface comprises a generally convex surface.

* * * * *

UNITED STATES PATENT AND TRADEMARK OFFICE
CERTIFICATE OF CORRECTION

| | | |
|---|---|---|
| PATENT NO. | : 7,147,074 B1 | Page 1 of 1 |
| APPLICATION NO. | : 10/782506 | |
| DATED | : December 12, 2006 | |
| INVENTOR(S) | : Norman O. Berg et al. | |

It is certified that error appears in the above-identified patent and that said Letters Patent is hereby corrected as shown below:

Col. 13, line 49, claim 5, delete "ridgity" and insert --rigidity--

Signed and Sealed this

Tenth Day of April, 2007

JON W. DUDAS
*Director of the United States Patent and Trademark Office*